(12) United States Patent
Baun et al.

(10) Patent No.: US 6,445,498 B1
(45) Date of Patent: Sep. 3, 2002

(54) UPGRADEABLE TELESCOPE SYSTEM

(75) Inventors: Kenneth W. Baun, Trabuco Canyon; John E. Smith, Mission Viejo; Michael A. Wachala, Riverside; Brian G. Tingey, Fountain Valley; Brent G. Duchon, Garden Grove; Stanley H. Dewan, Rancho Santa Margarita, all of CA (US)

(73) Assignee: Meade Instruments Corporation, Irivne, CA (US)

( * ) Notice: Subject to any disclaimer, the term of this patent is extended or adjusted under 35 U.S.C. 154(b) by 0 days.

(21) Appl. No.: 09/427,385

(22) Filed: Oct. 25, 1999

Related U.S. Application Data

(60) Provisional application No. 60/105,659, filed on Oct. 26, 1998.

(51) Int. Cl.[7] .................................................. G02B 23/00
(52) U.S. Cl. ...................................... 359/430; 359/429
(58) Field of Search .............................. 359/429, 430; 74/89.14, 425

(56) References Cited

U.S. PATENT DOCUMENTS

| | | | | |
|---|---|---|---|---|
| 3,147,553 A | * | 9/1964 | Cogswell | 359/430 |
| 3,752,004 A | * | 8/1973 | Hanssen | 74/443 |
| 4,129,278 A | | 12/1978 | Bressler | 248/165 |
| 4,270,405 A | * | 6/1981 | Niemann et al. | 74/499 |
| 4,281,928 A | | 8/1981 | Brunson | 356/140 |
| 4,308,759 A | * | 1/1982 | Sobotta | 74/425 |
| 4,502,572 A | * | 3/1985 | Davidson et al. | 74/18.2 |
| 4,541,294 A | * | 9/1985 | Byers | 74/89.14 |
| 4,709,178 A | | 11/1987 | Burr | 310/80 |
| 4,919,523 A | * | 4/1990 | Burr | 359/429 |
| D412,920 S | | 8/1999 | Diebel et al. | D16/132 |
| 6,016,716 A | * | 1/2000 | Mauro | 74/425 |

* cited by examiner

*Primary Examiner*—Cassandra Spyrou
*Assistant Examiner*—Jennifer Winstedt
(74) *Attorney, Agent, or Firm*—John W. Eldredge; Stradling, Yocca, Carlson & Rauth

(57) ABSTRACT

A telescope system facilitates easy upgrading from friction lock mounting to manual worm drive, and from manual worm drive to motor drive. Vibration isolation provides a steady field of view for enhanced observation and photography. A telescope mount facilitates enhanced below the horizon and zenith viewing. A tripod has detents which hold the legs thereof in a deployed position during handling of the tripod. A cam lock reliably maintains a desired length of telescoping tripod legs. An X-Y adjustable finder scope facilitates easy alignment thereof with the telescope

18 Claims, 12 Drawing Sheets

UPGRADEABLE TELESCOPE SYSTEM

PRIORITY CLAIM

This application takes priority from provisional patent Application Ser. No. 60/105,659, filed Oct. 26, 1998 entitled "Upgradeable Telescope System," the entire contents of which are expressly incorporated herein by reference.

CROSS-REFERENCE TO RELATED APPLICATIONS

This patent application is related to co-pending patent application entitled TELESCOPE SYSTEM HAVING AN INTELLIGENT MOTOR CONTROLLER and to co-pending patent application entitled FULLY AUTOMATED TELESCOPE SYSTEM WITH DISTRIBUTED INTELLIGENCE, both filed on instant date herewith and commonly owned by the Assignee of this patent application, the entire contents of both of which are hereby expressly incorporated by reference.

FIELD OF THE INVENTION

The present-invention relates generally to telescopes of the type commonly used to observe and photograph celestial objects. The present invention relates more particularly to a telescope system which can be easily upgraded from friction lock mounting to manual worm drive, and from manual worm drive to motor drive. Further, the present invention comprises a mount which facilitates enhanced below the horizon and zenith viewing a motor vibration isolation system, an adjustable worm drive, a tripod having detents which hold the legs in a deployed position thereof during handling of the tripod, a cam lock for maintaining a desired length of the tripod legs and an X-Y adjustable finder scope.

BACKGROUND OF THE INVENTION

Telescopes for observing and/or photographing celestial objects such as planets, moons, stars, galaxies, asteroids, comets, nebulae, and the like are well known. Such telescopes range in size from small, readily portable ones to large fixed ones which are permanently located in observatories. The smaller telescopes are commonly used by students, hobbyists and amateur astronomers. The larger telescopes are generally only used by researchers and professional astronomers.

Common types of telescopes include refractor telescopes, reflector telescopes, Schmidt-Cassegrain telescopes and Maksutov-Cassegrain telescopes. Refractor telescopes have a light collecting objective lens which focuses the collected light upon an eyepiece. The eyepiece, in cooperation with the objective lens, provides the desired magnification.

A reflector telescope utilizes a primary mirror to collect light and a secondary mirror to reflect the collected light through an opening in the telescope tube to an eyepiece. The eyepiece is mounted upon the tube, typically near the front of he tube, and is positioned orthogonal to the tube. The eyepiece cooperates with the primary mirror to provide the desired magnification.

Schmidt-Cassegrain telescopes are similar to reflector telescopes, except that the secondary mirror of a Schmidt-Cassegrain telescope reflects the collected light through an opening in the primary mirror instead of through an opening in the tube. In this manner, the eyepiece can be located directly behind the primary mirror, which is convenient for some types of viewing and photography. Additionally, light enters a Schmidt-Cassegrain telescope through a thin, two-side a spheric lens, known as a correction plate. Further, the secondary mirror is convex, so as to increase the effective focal length of the primary mirror.

Maksutov-Cassegrain telescopes are similar to Schmidt-Cassegrain telescopes, except that in Maksutov-Cassegrain telescopes light enters the telescope through a meniscus lens and an oversize primary mirror is used to provide an unvignetted field of view.

In viewing celestial objects with any type of telescope, it is necessary to continually move the telescope, so as to maintain the telescope in desired alignment with the celestial object. This is necessary to compensate for the rotation of the earth with respect to the cosmos. Thus, such continual realignment of the telescope maintains the desired celestial object within the field of view of the telescope as the earth rotates about its axis.

Smaller, portable telescopes of the reflector, refractor, Schmidt-Cassegrain, Maksutov-Cassegrain or any other desired type are typically mounted upon a tripod to facilitate portability and use of the telescope upon uneven outdoor surfaces, such as upon the ground, upon paved surfaces such as roads or parking lots, or upon any other desired surface.

Two different types of mounts, altitude azimuth and equatorial, are commonly used to removably attach a telescope to a tripod. Altitude azimuth (altazimuth) mounts provide a comparatively rigid and steady mount for the telescope, but are more difficult to maintain in alignment with a desired celestial object when the telescope is being aimed manually. Altitude azimuth mounts have only two perpendicular axes of rotation, which make altitude azimuth telescopes inherently more rigid and stable than equatorial telescopes. The altitude axis of rotation allows the telescope to pivot with respect to the mount about a horizontal axis and the azimuth axis of rotation allows the telescope to pivot about a vertical axis. In order to maintain alignment of a telescope having an altitude azimuth mount with respect to a desired celestial object, it is generally necessary to move the telescope about both the altitude and azimuth axes, since the position of celestial objects generally varies in both altitude and azimuth as the earth rotates.

Equatorial mounts facilitate easier maintenance of alignment of the telescope with a desired celestial object, since the telescope must only be moved about a single axis so as to maintain such alignment. In an equatorial mount, two orthogonal axis are configured such that one of the two axes can easily be aligned so as to be parallel to the axis of rotation of the earth. Once such alignment with the earth's axis of rotation is accomplished, then it is merely necessary to move the telescope about the other axis, so as to maintain alignment of the telescope with a desired celestial object. Thus, with an equatorial mount only a single axis of the telescope needs to be moved in order to maintain such alignment.

However, in an equatorial mount it is necessary to provide two additional orthogonal axis of alignment (similar to those of an altitude azimuth mount) in order to facilitate alignment of one axis so as to be parallel to the earth's axis of rotation. Thus, an equatorial mount actually comprises an altitude azimuth mount plus two additional axes and thus has a total of four different alignment axes. Because the equatorial mount comprises four different alignment axis, and because each axis inherently decreases the stability of the mount, it is difficult to manufacture an equatorial mount which is as stable as a comparable altitude azimuth mount (which has only two axes of alignment).

Portable, tripod mounted telescopes have evolved to the point where they are comparable in quality to the larger, fixed telescopes of observatories. With the advent of precise alignment control and electronic imaging, it is now possible to use such portable telescopes to take pictures of celestial objects which could only be photographed by observatories just a few years ago.

Although such contemporary portable telescopes have proven generally useful for their intended purposes, they do possess substantial deficiencies. For example, contemporary portable telescopes are not easily upgradeable, they are typically susceptible to vibration caused by drive motors, they cannot always be oriented as desired, they utilize tripods which are unreliable or difficult to use, and they have a finder scope which is difficult to align with the telescope.

Frequently, a telescope is purchased in a basic, or less expensive configuration, and it is later desired to upgrade the telescope so as to provide desirable features and enhanced functionality. For example, it is common for an amateur astronomer to first purchase a small refractor telescope which has a mount which utilizes friction locks to maintain the desired orientation of the telescope. The telescope is aimed at a desired celestial body by loosening the friction locks and manually manipulating the telescope with respect to the tripod, so as to effect the desired alignment. The friction mounts are then tightened to prevent the telescope from moving.

However, as those skilled in the art will appreciate, such friction lock mounts are clumsy and extremely difficult to use. Fine adjustments in alignment, which are frequently necessary so as to maintain a desired celestial object within the field of view of the telescope, are extremely difficult to make when utilizing friction lock mounts. Usually, manual manipulation of the telescope results in uneven, jerky movements of the telescope. It is almost impossible to take long exposure photographs with a telescope having friction mounts. Further, the very act of tightening a friction lock (which is intended to maintain desired alignment) frequently causes undesirable misalignment of the telescope. Thus great care must be taken in the use of such friction lock mounts so as to maintain desired alignment of the telescope.

Because of the difficulty of maintaining desired alignment of the telescope with respect to a celestial object being observed or photographed, it is frequently desirable to upgrade the telescope to utilize manual worm drives, rather than friction lock mounts. To change the altitude or azimuth alignment of a telescope which utilizes manual worm drives, the user merely turns a knob associated with the desired axis to be adjusted, so as to effect comparatively smooth rotation of the telescope about that axis. For example, to change the altitude alignment of the telescope, the user merely turns the altitude manual worm drive knob. The worm drive provides gear reduction, such that turning the knob results only in very minute changes in altitude adjustment, thus facilitating very precise and easy alignment of the telescope is obtained. The worm drive also provides a much greater degree of stability as compared to a friction drive. In a worm drive, the adjustment knob is attached to a worm, which rotates a worm gear as the knob is turned. Such a worm/worm gear arrangement is inherently stable and tends to resist movement of the telescope unless the adjustment knob is turned. With a manual worm drive, it is even possible for a very patient user to maintain sufficient alignment of the telescope to facilitate long exposure celestial photography.

However, such manual adjustment of the telescope requires constant attention, particularly during celestial photography. Thus, it is desirable to further upgrade the telescope by motorizing the worm drive, so as to eliminate the need for such constant manual adjustment. When utilizing a motorized worm drive, a computer may be utilized to provide control signals to the motors, so as to continuously effect the desired alignment. Further, the computer may further be utilized to find the desired celestial object, as well as to aid in an initial alignment of the telescope.

Thus, it is clear that a series of consecutive upgrades to a telescope is frequently desirable. However, effecting such upgrades with contemporary telescopes is typically a difficult, costly and time consuming endeavor. Quite often, the telescope or the mount must be modified, so as to accommodate such upgrades. As such, it is desirable to provide a telescope system which readily accommodates upgrading of the telescope mount from friction lock mounts to manual worm drives and from manual worm drives to motorized worm drives in a manner which is simple, convenient, and comparatively inexpensive.

Another problem commonly associated with contemporary telescopes is that those contemporary telescopes utilizing motor drives are undesirably subject to vibration caused by operation of the motors. As those skilled in the art will appreciate, the electric motors associated with such motor drives can operate at comparatively high speeds, e.g., occasionally as high as 15,000 rpm. At such high speeds, any slight imbalance in the motor tends to cause the motor to vibrate, and thus transmit such vibration through the drive motor assembly and the mount, to the telescope. It will be appreciated that even minute vibrations of the telescope are highly undesirable when high magnifications are used. When utilizing such high magnifications, even the slightest movement of the telescope will cause the viewed celestial object to move appreciably within the field of view. Indeed, excessive vibration will make the telescope unusable for celestial photography at higher magnifications. Thus, it is desirable to isolate the motor from the telescope, so as to mitigate vibration of the telescope caused by the motor.

Another problem commonly associated with contemporary telescopes is that during below the horizon and during zenith viewing, it is frequently difficult to orient contemporary telescopes at the desired angle. Below the horizon viewing is viewing in which the telescope is oriented such that it points in a direction below horizontal, i.e., points somewhat downwardly. Below the horizon viewing is also frequently used during terrestrial observations, particularly when the telescope is situated at a higher elevation than the object being observed, such as when the telescope is located within a tall building or upon a hill. Zenith viewing occurs when the telescope is oriented such that it is substantially vertical, i.e., aimed directly overhead. As discussed above, contemporary telescope mounts inhibit such viewing. Further, it is necessary to continually vary the alignment of the telescope, so as to maintain a desired celestial object within the field of view. Occasionally, particularly during celestial photography, it is desirable to maintain the celestial object within the field of view as long as possible. Thus, it is occasionally desirable to maintain the desired celestial object within the field of view by orienting the telescope for below the horizon and/or zenith viewing.

As those skilled in the art will appreciate, contemporary mounts tend to undesirably limit the angle at which below the horizon and zenith viewing is possible. Such contemporary mounts interfere with desired movement of the telescope during below the horizon and zenith viewing such that the telescope undesirably abuts the mount when moved to its extreme limit of travel during such viewing. Thus, it is desirable to provide a telescope mount which facilitates below the horizon and zenith viewing at enhanced angles.

As discussed above, portable telescopes are frequently mounted upon tripods. Although such tripods provide an inexpensive and convenient means for mounting the telescope, contemporary tripods do possess deficiencies. For example, when a contemporary tripod is picked up, as when moving the telescope from one location to a nearby location, or when disassembling the telescope for transport, the legs of the tripod tend to fold in from their extended or deployed positions undesirably. Such folding, when merely moving the telescope from one location to a nearby location, necessitates that the user redeploy the tripod legs at the new location. As those skilled in the art will appreciate, such redeploying of the telescope legs is difficult, particularly when a single person is attempting to move the telescope. Thus, it would be desirable to provide a tripod which maintains the legs thereof in a deployed position until the user desires that the legs be folded or stowed.

Yet another problem commonly associated with contemporary telescopes is that of unreliable locking mechanisms for maintaining the tripod legs at the desired length thereof. Many tripods utilize telescoping legs, so as to facilitate easy storage and transportation thereof. Such telescoping tripod legs may be adjusted to the desired length and locked in place. However, the locks of contemporary telescopes are frequently unreliable. When such a lock fails, then one leg of the tripod collapses, resulting in loss of alignment of the telescope with the object being viewed and possibly resulting in substantial damage to the telescope. Thus, it is desirable to provide a positively acting, reliable lock for telescoping tripod legs.

Yet another disadvantage associated with contemporary telescopes is the manner in which finder scopes thereof are mounted to the telescope and adjusted with respect thereto. Contemporary finder scopes are typically attached to telescopes utilizing two brackets which are spaced apart along the length of the finder scope and which attach rigidly to the telescope. The contemporary finder scope is held in position with respect to each of the two brackets by three set screws which threadedly engage the bracket and which bear upon the finder scope. The finder scope is aligned with the telescope by loosening at least one of the three set screws of a bracket and then tightening one or two of the other set screws of the same bracket.

However, this process is not intuitive in that it tends to move the finder scope in two orthogonal directions (as related to a X-Y coordinate system) simultaneously. That is, such contemporary finder scopes do not facilitate movement thereof in only a selected one of two orthogonal directions. Thus, a contemporary finder scope tends to move in both the X and Y direction when any adjustment is made thereto. Such operation of the finder scope can be extremely confusing, particularly for novices. Thus, alignment of a contemporary finder scope can require an undesirably excessive amount of time.

As those skilled in the art will appreciate, it is necessary to properly align the finder scope with the telescope, so as to facilitate aiming of the telescope at a desired object. The finder scope must be in alignment with the telescope in order to facilitate alignment of the telescope with the desired celestial object. Thus, it is desirable to provide a mount for a finder scope which facilitates adjustment of the finder scope in only a single X-Y direction at a time, so as to simplify alignment thereof with respect to a telescope.

SUMMARY OF THE INVENTION

The present invention specifically addresses and alleviates the above-mentioned deficiencies associated with the prior art. More particularly, the present invention comprises a telescope system of the type commonly used to observe and photograph celestial objects. The telescope system comprises a telescope, a tripod supporting the telescope, and a mount attaching the telescope to the tripod in a manner which facilitates rotation of the telescope about first and second generally orthogonal axis.

According to the present invention, the telescope system facilitates easy, convenient, and comparatively inexpensive upgradeability from friction lock mounts to manual worm drives and from manual worm drives to motor worm drives. The telescope system of the present invention is constructed so as to mitigate vibration from the motor, so as to facilitate enhanced viewing and photography. The mount is configured so as to facilitate below the horizon and zenith viewing and photography at enhanced angles. The tripod is constructed so as to maintain the legs thereof in either the deployed or stowed positions, as desired. The legs of the tripod comprise locks which are positive acting and reliable. The finder scope of the present invention is constructed so as to facilitate alignment thereof with the telescope by moving the finder scope in a single X-Y direction as an alignment adjustment is being performed, thereby substantially simplifying the alignment process.

The mount comprises a base pivotally attached to the tripod to define the first or azimuth axis, two arms extending from the base to which the telescope is pivotally attached to define the second or altitude axis, a first cutout formed in the mount for providing clearance to the telescope when the telescope is oriented for below the horizon viewing, so as to enhance an angle at which the telescope is capable of being oriented during below the horizon viewing, and a second cutout formed in the mount for providing clearance to the telescope when the telescope is oriented for zenith viewing, so as to enhance an angle at which the telescope is capable of being oriented during zenith viewing. The first and second cutouts are preferably formed in either the base or are formed in a fork defined by the two arms. The first and second cutouts may likewise be formed in any portion of the mount which undesirably limits movement of the telescope. The arms preferably extend from the base at an angle of between approximately 30° and approximately 60°, preferably approximately 45°, with respect to vertical.

Further, and according to the present invention, an UPGRADEABLE telescope system comprises a first pivot attaching the telescope to the mount for facilitating rotation of the telescope about the azimuth axis and a-second pivot attaching the mount to the tripod for facilitating rotation of the telescope about the altitude axis. Thus, the first pivot preferably defines a generally horizontal axis of rotation, i.e., an altitude axis, and the second pivot defines a generally vertical axis of rotation, i.e., an azimuth axis. A first friction lock is configured to mitigate rotation of the telescope about the first axis. The first friction lock is configured to removably attach a first worm drive thereto. Similarly, a second friction lock is configured to mitigate rotation of the telescope about the second axis. The second friction lock is likewise configured to removably attach a second worm drive thereto. Thus, the first and second friction locks are configured so as to facilitate easy, convenient, and inexpensive upgrade thereof from friction lock mounting to manual or motorized worm drives.

The first and second friction locks comprise a friction lock housing, a knob which is rotatable with respect to the friction lock housing so as to effect engagement of the friction lock, and a plurality of threaded openings formed in the friction lock housing for receiving threaded fasteners so as to removably attach a worm drive to the friction lock housing.

Each of the first and second friction locks preferably further comprise a spacer located intermediate the knob and the friction lock housing. The spacer provides room for the worm drive when the spacer is removed. Thus, according to the preferred embodiment of the present invention, a portion of a worm drive may optionally be located intermediate the knob and the friction lock housing. The worm drive is removably attachable to each of the first and second friction lock housings so as to effect either manual or motorized rotation of the telescope about the altitude and azimuth axis.

Each worm drive comprises a housing which is configured to removably attach a motor so as to facilitate motorized operation thereof. According to the preferred embodiment of the present invention, each worm drive housing comprises at least one threaded opening for receiving a threaded fastener, so as to removably attach a motor to the worm drive housing. Thus, according to the present invention, a motor is removably attachable to each worm drive housing so as to effect rotation of the telescope about the altitude and azimuth axes thereof.

According to the preferred embodiment of the present invention, each worm drive comprises a worm gear coupled to effect rotation of the telescope when the worm gear rotates, a worm coupled to effect rotation of the worm gear when the worm rotates, and a knob coupled to effect rotation of the worm when the knob rotates. The knob is manually rotatable, so as to facilitate manual adjustment of the altitude and azimuth axis. According to the preferred embodiment of the present invention, the worm gear of each worm drive is configured such that it rotates upon a shaft without effecting rotation of the shaft when a knob of the friction lock to which the worm drive is attached is loose, and such that the worm gear effects rotation of the shaft when the knob of the friction lock to which the worm drive is attached is tight. Rotation of the shaft effects rotation of the telescope. Further, according to the preferred embodiment of the present invention, two metal washers are disposed upon the shaft. One metal washer is located upon each side of the worm gear and is configured so as to rotate with the shaft. Thus, the two metal washers and the worm gear define a clutch which is controlled by the knob, such that the clutch engages when the knob is tightened and disengages when the knob is loosened.

A polystyrene friction washer is preferably located intermediate each metal washer and the worm gear and is configured so as to rotate independently with respect to the shaft. The polystyrene friction washers tend to provide a generally constant coefficient of friction between the metal washers and the worm gear when the drive knob is tight. The polystyrene friction washers tend to provide a generally constant coefficient of friction regardless of contamination thereof with oily or greasy substances such as lubricants.

Optionally, a hand-held controller controls the motors, so as to facilitate aiming of the telescope at a desired celestial object. The hand held controller comprises either a key pad for facilitating input of commands to move the telescope in altitude and azimuth, or alternatively comprises a joy stick for facilitating input of commands to move the telescope in altitude and azimuth. Optionally, the hand-held controller comprises a microprocessor configured to aim the telescope at a desired celestial object when either a designation, e.g., name or number, of the celestial object or coordinates of the celestial object are entered into the hand-held controller.

The telescope system of the present invention preferably comprises a tripod having a head and three legs pivotally attached to the head and extending downwardly from the head. The three legs have a stowed position and a deployed position. Preferably, a detent is formed upon each leg and is configured so as to releasably hold each leg in the deployed position thereof. As is common in contemporary tripods, the legs are preferably configured so as to telescope in order to vary the length thereof, as desired.

The detent may be formed upon either the head or upon each leg. The detent preferably comprises a protrusion formed upon either the head or upon each leg. Thus, each detent comprises either a protrusion formed upon the head and a corresponding generally flat surface formed upon each leg, such that the flat surface abuts the protrusion and tends to compress the protrusion as the leg is moved from the deployed position to the stowed position thereof, or the detent alternatively comprises a protrusion formed upon each leg and a corresponding generally flat surface formed upon the head for each protrusion, such that the flat surface abuts each protrusion and tends to compress the protrusion as the leg is moved from the deployed position to the stowed position thereof. Preferably, each detent is also configured to releasably hold the leg in the stowed position thereof. Preferably, the tripod further comprises a first stop formed upon the head for defining the deployed position of each leg and a second stop formed upon the head for defining the stowed position of each leg. The first and second stops limit the range of travel of the legs so as to define the deployed and stowed positions thereof.

Each of the legs of the tripod preferably comprise a lock for maintaining the leg at a desired length. The lock preferably comprises a lever having a cam formed thereon. The lever is pivotally attached to the leg section having the larger diameter of the two telescoping sections thereof, e.g., the upper section. A pusher is formed of a substantially rigid material and the cam is configured such that the cam pushes the pusher toward the second leg section when the lever is moved. A friction pad is located upon the pusher and comprises a substantially resilient material. The friction pad is configured to contact the second leg section when the pusher is pushed there toward, so as to frictionally engage the second leg section and thereby mitigate movement of the second leg section with respect to the first leg section.

The telescope system of the present invention preferably further comprises a finder scope which is attached to the telescope for aiding in alignment of the telescope with respect to a desired celestial object which is to be observed or photographed with the telescope. The finder scope comprises a tube having proximal and distal ends, an eyepiece located at the proximal end of the tube, an objective lens located at the distal end of the tube, and first and second brackets spaced apart along the tube for adjustably attaching the tube to the telescope. The first bracket comprises a first pair of parallel knife edges defining a first opening and the second bracket similarly comprises a second pair of parallel knife edges defining the second opening. Each pair of knife edges define pivot about which the finder scope can rotate with respect to the telescope. The tube is located within the first and second openings, such that it extends there through, and the first and second pairs of knife edges are oriented generally orthogonally to one another, so as to facilitate adjustment of the finder scope in two generally orthogonal directions. The first mount is preferably located near the proximal end of the tube and the second mount is preferably located near the distal end of the tube.

According to the preferred embodiment of the present invention, a first pair of opposed set screws threadedly engage the first mount and are located upon opposite sides of the tube, so as to effect movement of the tube within the first opening. Similarly, a second pair of opposed set screws threadedly engage the second mount and are located upon opposite sides of the tube, so as to effect movement of the tube within the second opening. The first and second mounts are preferably configured such that movement of the tube within the first opening causes rotation of the tube about a first axis and movement of the tube within the second opening causes rotation of the tube about a second axis, wherein the first and second axis are generally orthogonal to one another. According to the preferred embodiment of the present invention, the first axis is located proximate the second opening and is generally parallel to the knife edges of the second opening and the second axis is located proximate the first opening and is generally parallel to the knife edges of the first opening.

Thus, according to the present invention, a method for aligning a finder scope with respect to a telescope, so as to facilitate subsequent use of the finder scope in alignment of the telescope with respect to a celestial object to be observed or photographed with the telescope comprises the steps of moving the finder scope along a first pair of knife edges defining a first opening through which the finder scope extends, so as to align the finder scope in a first axis with respect to the telescope, and moving the finder scope along a second pair of knife edges defining a second opening through which the finder scope extends, so as to align the finder scope in a second axis with respect to the telescope. The steps of moving the finder scope along the first and second pairs of knife edges preferably comprise sliding the finder scope along the first and second pairs of knife edges. More particularly, the steps of moving the finder scope along the first and second pairs of knife edges preferably comprise loosening a first set screw to facilitate movement of the finder scope with respect to the first pair of knife edges, tightening a second set screw such that the second set screw causes the finder scope to move with respect to the first pair of knife edges, loosening a third set screw to facilitate movement of the finder scope with respect to the second pair of knife edges, and tightening a fourth set screw such that the fourth set screw causes the finder scope to move with respect to the second pair of knife edges. After the second and fourth set screws have been tightened sufficiently, so as to position the finder scope in desired alignment with the telescope, then the first and third set screws are tightened, as necessary, so as to lock the finder scope into alignment with the telescope.

Further, according to the present invention, a first shaft is rigidly attached to the telescope and a second shaft is rigidly attached to the base of the mount. The first shaft is pivotally attached to one of the two arms of the mount so as to define a first axis of two generally orthogonal axes is and the second shaft is rigidly attached to the base and pivotally attached to the tripod so as to define a second axes of the two generally orthogonal axes. At least one worm drive effects desired movement of the telescope with respect to the tripod. Each worm drive comprises a worm gear formed upon one of the first and second shafts, a worm having first and second ends engaging each worm gear. A pair of resilient supports facilitate mounting of each worm. One resilient support is located proximate the first end of each worm and the other resilient support is located proximate the second end of each worm. The resilient supports provide shock/vibration isolation of the worm with respect to the telescope. The resilient supports preferably comprise rubber, preferably Shore A 50 silicone rubber. Those skilled in the art will appreciate that various other resilient polymer materials and the like are likewise suitable.

Each of the resilient supports preferably comprise a body having a flat side and an opening form through the body. The worm extends through the opening. One resilient support facilitates mounting of the worm at each end of the worm. Further, a bushing is located within the opening of the body of each support, for facilitating rotation of the worm with respect to the support. The bushing is preferably comprised of a rigid polymer materials, such as polyethylene terephthalate (PET).

According to the preferred embodiment of the present invention, each worm drive further comprises two set screws, one set screw for adjusting the position of each of the two supports with respect to the worm gear, so as to facilitate desired engagement of the worm with the worm gear. The worm drive preferably further comprises a pusher block for each support configured such that one of the set screws pushes against the pusher block and the pusher block pushes against the support. The pusher block is preferably comprised of acrylonitrile butadiene styrene resin (ABS). Adjusting the desired set screw causes the pusher block to move in a manner which effects corresponding movement of the associated support, thereby facilitating adjustment of the position of the worm with respect to the worm gear. Thus, both ends of the worm can be adjusted so as to facilitate proper alignment of the worm with respect to the worm gear, as well as the desired degree of engagement therewith.

Further, according to the present invention, each worm gear comprises oil impregnated, copper-steel powdered metal and each worm comprises bronze. Each worm gear preferably comprises copper-steel powdered metal in compliance with specification MTIS FC-0208-50. The first and second shafts preferably comprise steel. Further, according to the preferred embodiment of the present invention, at least one bronze bushing (preferably two bronze bushings) is positioned about each of the first and second shafts to facilitate rotation thereof. Further, according to the present invention, the motors for the worm drives preferably comprise electric motor assemblies. Each electric motor assembly preferably comprises a housing, a platform located within the housing, a plurality of first resilient shock/vibration mounts attaching the platform to the housing, an electric motor located upon the platform, and a plurality of second resilient shock/vibration mounts attaching the motor to the platform.

According to the present invention, a plurality of fasteners attach the platform to the housing. The plurality of first resilient shock/vibration mounts comprise two o-rings positioned around each fastener, so as to capture a portion of the platform there between. The housing preferably comprises first and second housing sections and the fasteners attach the first and second housing sections together.

The electric motor preferably comprises a boss form about a shaft of the electric motor at each end thereof. The platform preferably comprises two clamps, one clamp configured to hold each boss. The plurality of second resilient shock/vibration mounts preferably comprised two o-rings, wherein one o-ring is located around each bossed and is captured by each clamp. Alternatively, one or both of mounts comprise a resilient bracket or plate configured to mount the motor to the platform.

Preferably, a reduction gear assembly is mounted upon the platform for facilitating reduction in the rotational speed provided by the motor to the worm drive, while also increasing the torque thereof.

Thus, the present invention provides an easily upgradeable telescope system having improved vibration isolation with respect to the motor drives thereof. An improved tripod is provided which desirably maintains the legs in the stowed or deployed positions thereof and which reliably locks the legs in the desired extended position thereof. An improved finder scope facilitates easy alignment thereof with the telescope.

BRIEF DESCRIPTION OF THE DRAWINGS

These, and other features, aspects and advantages of the present invention will be more fully understood when considered with respect to the following detailed description, appended claims and accompanying drawings, wherein:

DETAILED DESCRIPTION OF THE INVENTION

Figure 1:
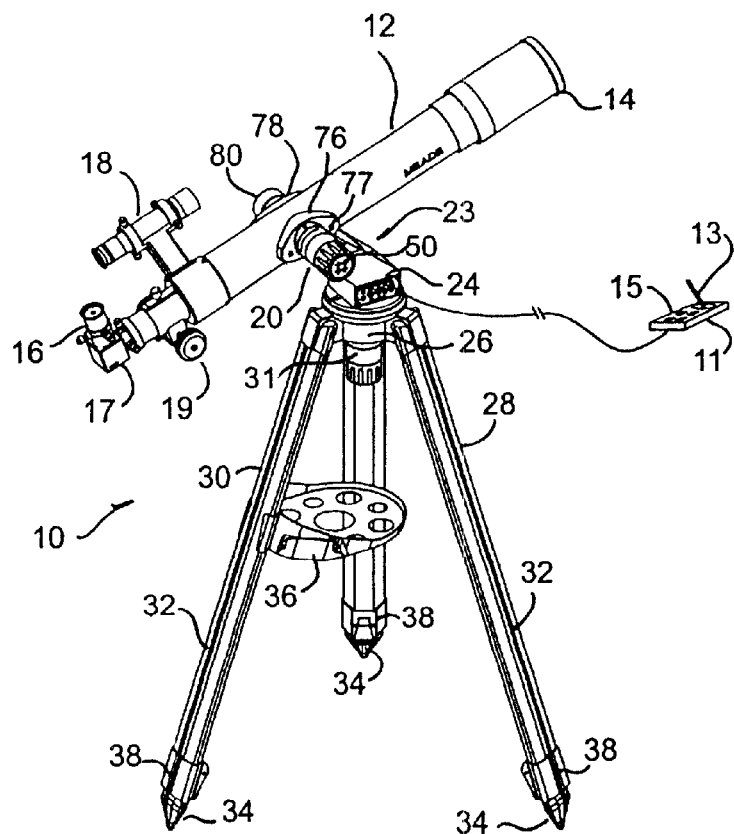
FIG. 1 is a perspective view of an upgradeable telescope system according to the present invention, having friction locks for the altitude and azimuth axes and showing the tripod thereof with the legs of the tripod in a deployed position.

The detailed description set forth below in connection with the appended drawings is intended as a description of the presently preferred embodiment of the invention, and is not intended to represent the only form in which the present invention may be constructed or utilized. The detailed description sets forth the construction and functions of the invention, as well as the sequence of steps for operating the invention in connection with the illustrated embodiment. It is to be understood, however, that the same or equivalent functions may be accomplished by different embodiments that are also intended to be encompassed within the spirit and scope of the invention. The upgradeable telescope system of the present invention is illustrated in FIGS. 1 through 18, which depict a presently preferred embodiment thereof. Referring now to FIG. 1, the upgradeable telescope system 10 of the present invention generally comprises a telescope 12 attached to a tripod 28 via mount 23 in a manner which facilitates movement of the telescope 12 about both a horizontal or altitude axis and a vertical or azimuth axis. As discussed herein and shown in the drawings, the telescope 12 comprises a refractor telescope. However, those skilled in the art will appreciate that the present invention is likewise applicable to other types of telescopes such as reflector telescopes, Schmidt-Cassegrain telescopes, Maksutov-Cassegrain telescopes, etc.

The telescope 12 comprises an objective lens 14 which collects light and focuses the collected light upon eyepiece 16, via prism or mirror 17. Focus knob 19 moves the eyepiece so as to facilitate focusing of the telescope 12. Interchangeable eyepieces are preferably utilized.

Finder scope 18 is used to aid in the alignment of the telescope 12 such that a desired celestial object can be observed or photographed therewith. Before using the finder scope to align the telescope, the finder scope must be aligned with the telescope. The present invention provides an improved finder scope 18, which is substantially easier to align than contemporary finder scopes, as discussed in detail below.

The mount 23 comprises a base 172 from which a fork 74 (both 172 and 74 are better shown in FIG. 11) extends to support the telescope 12. The mount 23 comprises mounting brackets 76 and 78, which attach to the telescope 12, preferably via fasteners such as bolts or screws 77. Optionally, motor and controller interface 24 facilitates electrical interconnection of a manual, held controller and axis drive motors. A friction lock 20, comprising a knob 50, is used to facilitate locking of the telescope 12 in a desired position, as discussed in detail below. Knob 80 formed upon mount bracket 78 is merely cosmetic and may be somewhat similar in appearance to knob 50 of friction lock 20. Similarly, pivoting of the mount 23 with respect to the tripod head 26 is controlled by friction lock 31, as described in detail below.

Figure 3:
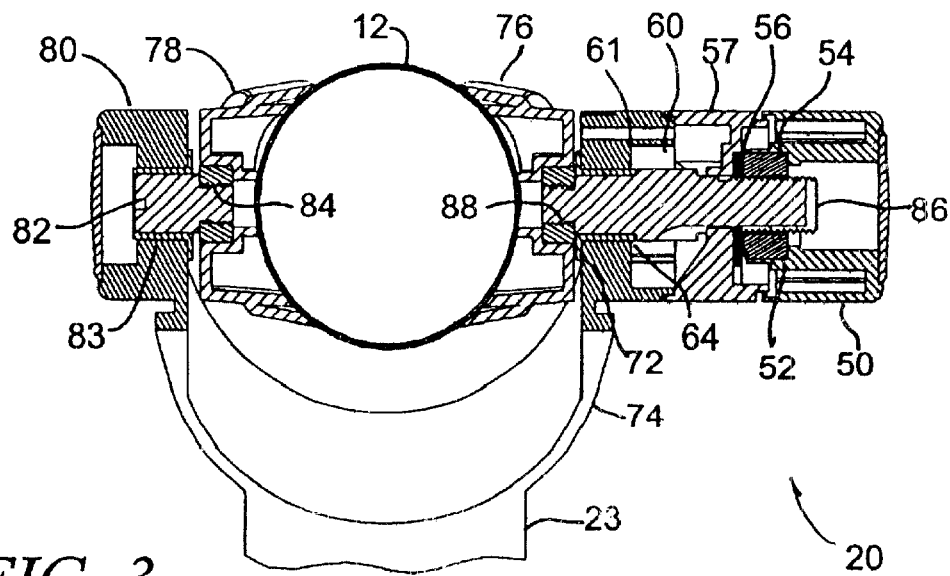
FIG. 3 is an enlarged cross sectional view of the altitude friction lock of FIG. 1.

First mount bracket 76 and second mount bracket 78 facilitate attachment of the telescope 12 to the mount 23 via pivot shafts 82 and 86 (FIG. 3). Mount 23 is configured so as to facilitate below the horizon viewing and zenith viewing at enhanced angles, as discussed in detail below.

Figure 11:
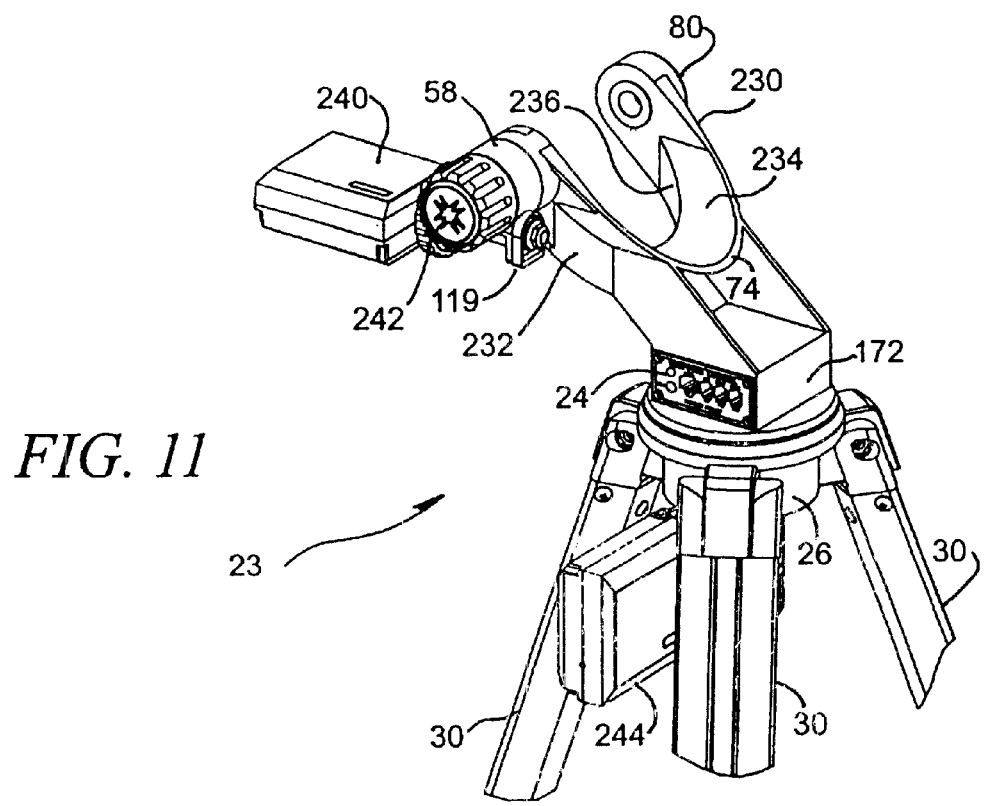
FIG. 11 is a first perspective view of the telescope mount of FIG. 5, wherein both the altitude and azimuth manual worm drives thereof have been upgraded to motorized worm drives.

Motor and controller connections 24 provide a convenient interface for a hand held controller 11 and telescope drive motor assemblies 240 and 244 (FIG. 11). Either a joystick 13 or a keypad 15 of controller 11 may be used to control the telescope drive motor. The motors 250 (FIG. 14) of drive motor assemblies 240, 244 are shock/vibration isolated with respect to the telescope 12, so as to enhance viewability and photographic applications of the telescope 12 by maintaining a comparatively steady field of view during use, as discussed in detail below. The mount 23 is pivotally attached to tripod head 26.

The tripod 28 further comprises three legs 30. Each leg 30 is pivotally attached to the tripod 26 head in a manner which maintains each leg in either the deployed or stowed position thereof during handling of the tripod 28, as discussed in detail below.

The tripod legs 30 preferably comprise upper tripod leg sections 32 and lower tripod leg sections 34 which telescope into the upper tripod leg sections 32. Cam locks 38 provide enhanced locking of the second leg sections 34 with respect to the first leg sections 32, as discussed in detail below. Eyepiece holder 36, attached to one of the legs 30, provides a convenient place to store a plurality of interchangeable eyepieces, such that the eyepieces are readily available, as desired.

The upgradeable telescope system of the present invention can easily be upgraded from friction locks, 20, 31 to manual worm drives 121, 123 and from manual worm drives 121, 123 to motorized worm drives, as discussed in detail below. As those skilled in the art will appreciate, friction locks 20, 31 merely hold the telescope 12 in position, relative to the tripod 28. Thus, in order to move the telescope 12 into position for observing or photographing a desired celestial object, it is generally necessary to loosen both the altitude friction lock 20 and the azimuth friction lock 31, so as to allow the telescope to rotate freely about both the altitude and azimuth axes. When the telescope 12 has been positioned roughly in alignment with the desired celestial object, then the altitude friction mount 23 and the azimuth friction lock 31 are tightened sufficiently to maintain the desired general alignment of the telescope 12, while also facilitating fine adjustment thereof by gently tapping or pushing the telescope in the desired direction. Once the desired celestial object is within the field of view of the telescope 12, preferably near the center of the field of view, then both the altitude friction lock 20 and the azimuth friction lock 31 are tightened, so as to inhibit further movement of the telescope 12 with respect to the tripod 28. However, those skilled in the art will appreciate that such manual positioning of the telescope is extremely difficult and does not usually result in desired alignment of the telescope 12 in a simple or timely fashion.

Figure 4:
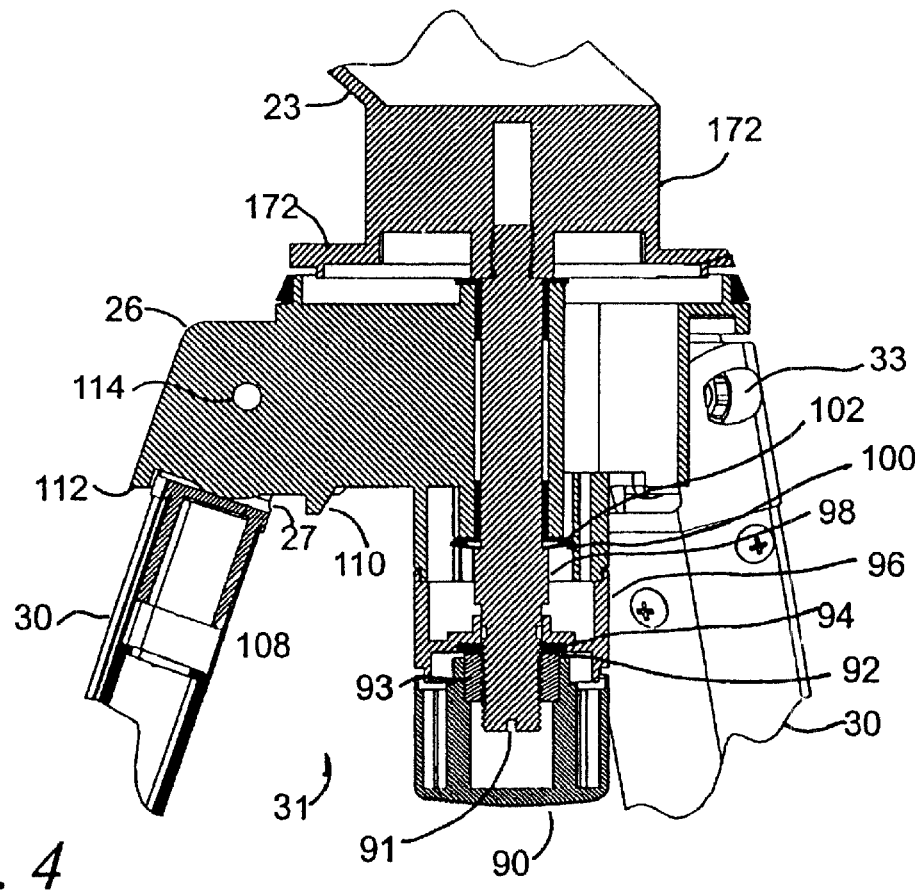
FIG. 4 is an enlarged cross sectional view of the azimuth friction lock of FIG. 1.
Figure 5:
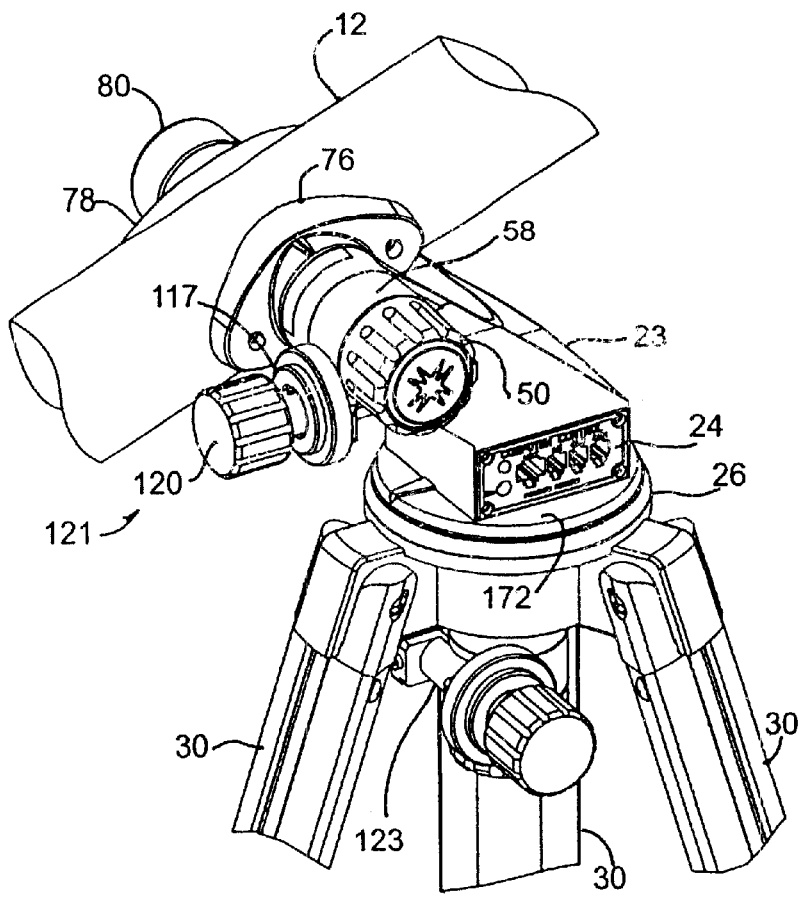
FIG. 5 is a perspective view of the upgradeable telescope system of FIG. 1, having the altitude and azimuth friction locks thereof upgraded to manual worm drives.

The legs 30 of the tripod 28 attach to the tripod head 26 via bolts which pass through openings 33 in the proximal ends of the tripod legs 30 and through corresponding openings 114 in the tripod head 26, as shown in FIG. 4.

Figure 2:
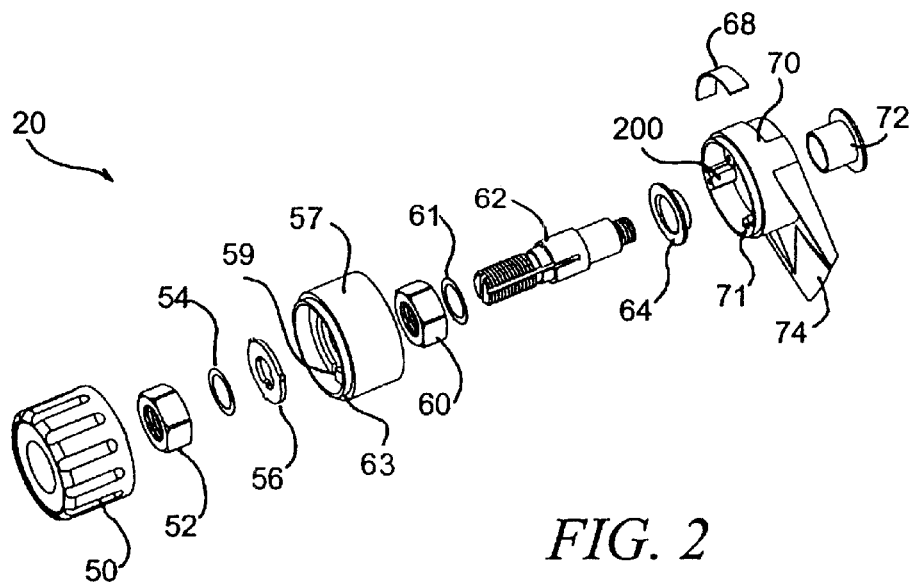
FIG. 2 is an exploded perspective view of the altitude friction lock of FIG. 1.

Referring now to FIGS. 2 and 3, an altitude friction lock 20 is shown. The azimuth friction lock 31 is analogous in structure and function. The altitude friction lock 20 comprises a shaft 62 which is rotatably attached to the fork 74 (best shown in FIGS. 11 and 12) of the mount 23. The shaft 62 rotates within bushings 64 and 72 which attach to the fork 232 as shown in FIG. 3. The shaft 62 is preferably comprised of steel and the bushings 64 and 72 are preferably comprised of bronze. The shaft 62 is attached to mount bracket 76 of the telescope 12, preferably via either threaded attachment to the nut 88 or via press fit. In a similar fashion, shaft 82 is attached to mount bracket 78, preferably via nut 84 or via press fit. Shaft 82 rotates within busing 83 of fork 74. The fork 74 is rotatably captured upon shaft 62 between the mount bracket 76 of the telescope 12 and nut 60 which is threaded to the shaft 62. Belleville washer 61 is positioned upon shaft 62 intermediate nut 60 and bushing 64. Spacer 57 attaches to fork 74 and is preferably configured so as to be seated upon lip 71 of fork 74. A similar flange 63 is preferably formed upon spacer 57 and is received within knob 50, so as to visually obscure internal components of the friction lock 20. The spacer 57 is removed from the friction lock 20 when an upgrade is performed to a worm drive, as discussed below. Tab washer 56 engages complimentary cutouts 59 formed in the spacer 57 so as to provide a bearing surface for washer 54 which abuts tab washer 56 when nut 52 is tightened upon shaft 62. Knob 50 is configured to receive and engage nut 52, such that rotation of knob 50 results in like rotation of shaft 62.

A scale, preferably printed or silk screened upon thin sheet metal 63, is optionally attached to the fork 74 in a corresponding index so as to provide a convenient reference for positioning the telescope 12. Threaded apertures 200 (better shown in FIG. 6) are not utilized in the friction lock 20, but rather are used when the friction lock 20 is upgraded to a worm drive, as discussed in detail below.

In operation, a user utilizes friction lock 20 to hold the telescope 12 in a desired position by tightening the knob 50 SO as to cause nut 52 to urge wave spring washer 54 against the bearing surface of tab washer 56. Since spacer 57 is rigidly attached to fork 74, rotation of shaft 62 is inhibited by tightening knob 50. That is, tightening nut 52 against bearing surface 56, via washer 54, tends to compress the washer 54 between the nut 52 and the tab nut 56 so as to lock the friction lock 20.

Referring now to FIG. 4, the azimuth friction lock similarly comprises a shaft 91 which is rotatably attached to the tripod head 26 and rotates within bronze bushings 102 and 104. The proximal end of the shaft 91 is rigidly attached to mount 23, preferably via either threaded or press fit. The azimuth friction lock 31 further comprises a knob 90, nut 93, wave spring washer 92, tab washer 94, spacer 96, nut 98, and Belleville washer 100, which are analogous to the same components of the altitude friction lock 20 and function in a like manner.

Referring now to FIGS. 5–9, the altitude 20 and azimuth 31 friction locks of the telescope system can easily be upgraded to manual worm drives 121, 123, if desired. As discussed above, although friction locks 20, 31 provide an inexpensive means for facilitating altitude and azimuth adjustment of the telescope 12, such friction locks 20, 31 are comparatively difficult to use. It is frequently desirable to upgrade a telescope having such friction locks 20, 31 to one which utilizes manual worm drives 121, 123, so as to make alignment of the telescope 12 in altitude and azimuth much easier and more precise.

Figure 6:
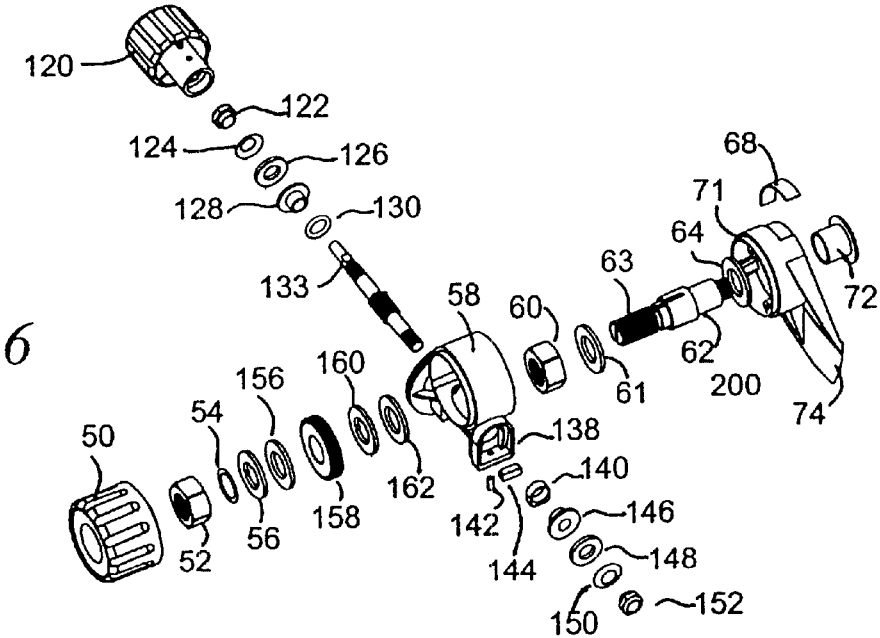
FIG. 6 is an enlarged, exploded perspective view of the altitude manual worm drive of FIG. 5.
Figure 7:
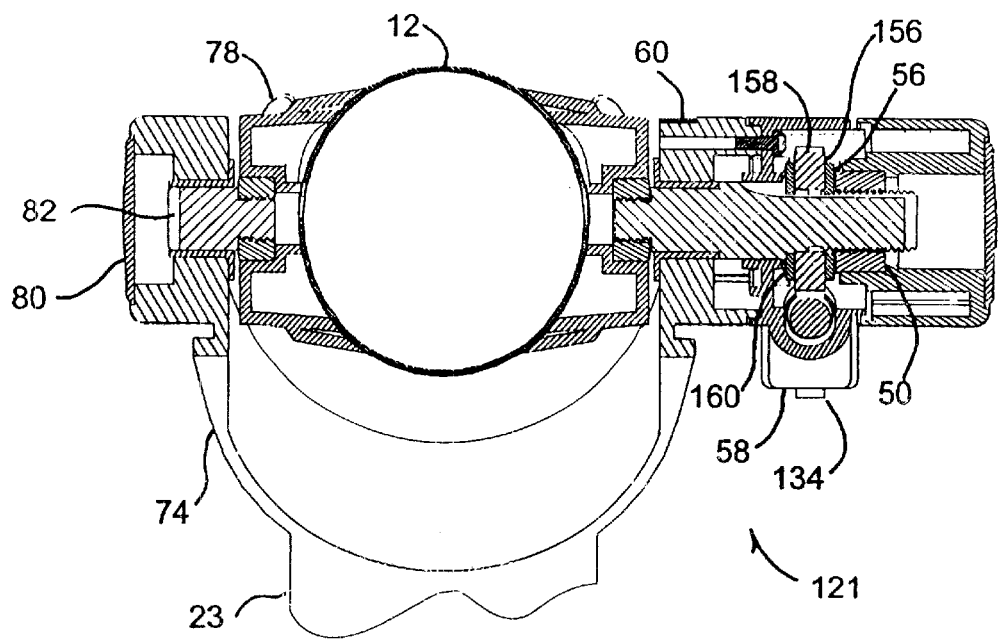
FIG. 7 is an enlarged cross sectional side view of the altitude manual worm drive of FIG. 5.
Figure 8:
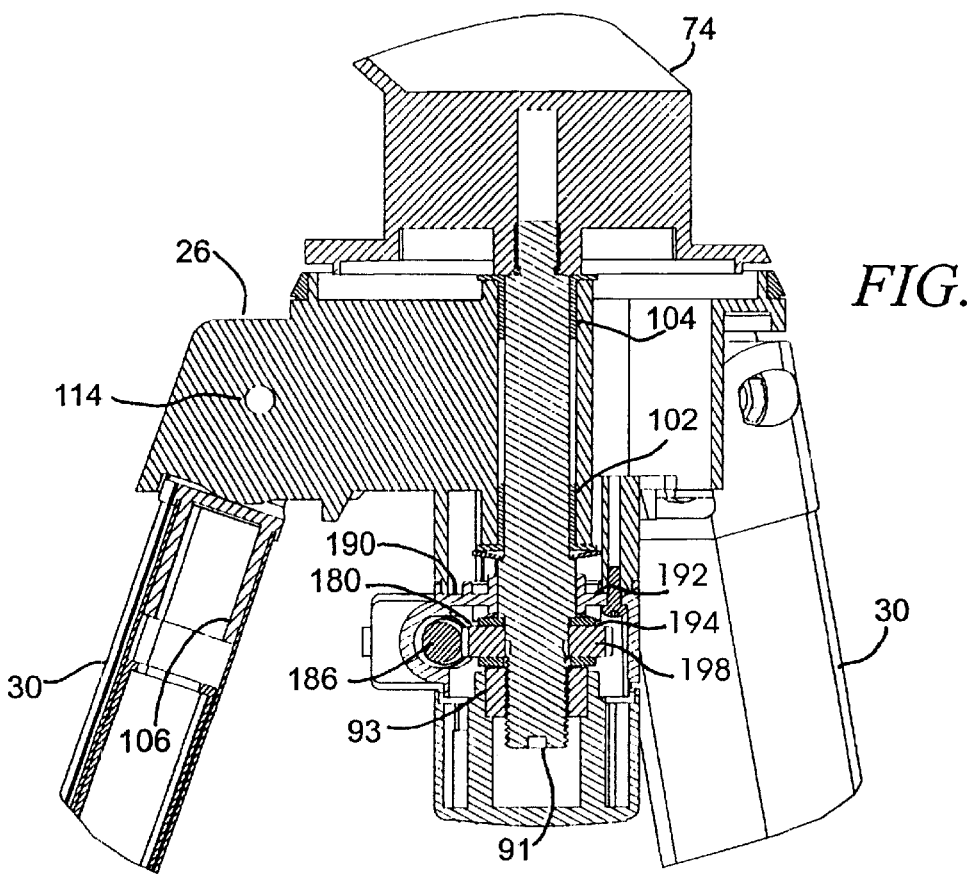
FIG. 8 is a cross sectional side view of the azimuth manual worm drive of FIG. 5; FIG.
Figure 9:
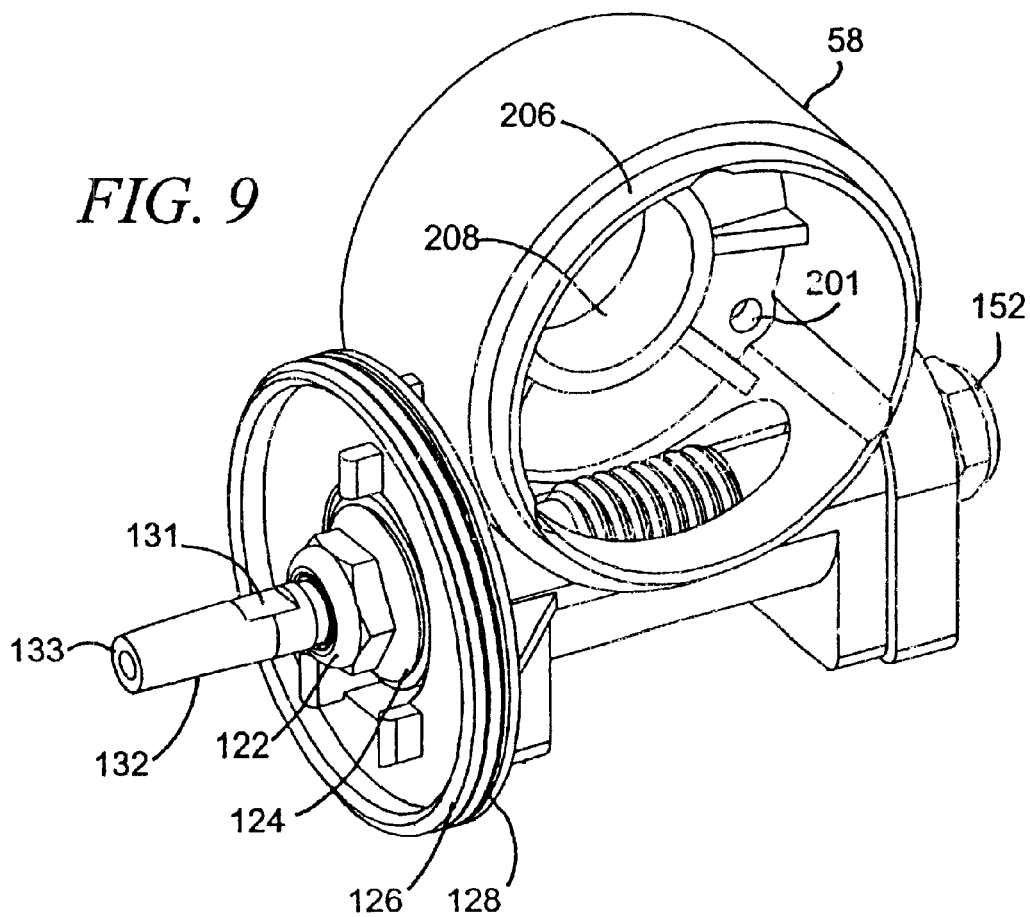
FIG. 9 is an enlarged perspective view of the worm drive of FIG. 6, showing one mounting aperture thereof.

With particular reference to FIG. 6, the altitude manual worm drive preferably comprises a phosphor bronze worm 132 which engages a worm gear 158 such that manual rotation of the worm 132 effects adjustment of the telescope 12 in altitude. Worm a gear 158 rotates independently with respect to shaft 62 upon which it is located. More particularly, the azimuth manual worm drive comprises a worm drive knob 120 which engages a nut 122 such that when the knob 120 is rotated, the nut 122 rotates likewise. The nut 122 is threaded to the worm 132 such that rotating nut 122 results in like rotation of worm 132. Worm 132 is rotatably attached to worm drive housing 58 via bushings 128 and 146. Belleville worm washer 124 and flat washer 126 are positioned upon worm 132 intermediate nut 122 and worm drive housing 58. Belleville washer 124 allows nut 122 to be tightened without substantially inhibiting rotation of shaft 132 with respect to worm drive housing 58. Flat washer 126 provides a bearing surface for Belleville washer 124. Similarly, nut 152 is threaded onto shaft 132 and Belleville washer 150 and flat washer 148 are disposed intermediate nut 152 and bushing 146. Bushings 128 and 146 are preferably comprised of plastic, preferably polyethylene terephthalate (PET). Bushings 128 and 146 preferably attached to worm drive housing 58 via resilient mounts 130 and 140, respectively. The resilient mounts 130 and 140 are positioned within complimentary recesses 138 of the worm drive housing 58. According to the preferred embodiment of the present invention, a pusher 144, 145, comprised of acrylonitrile butadiene styrene resin (ABS) is positioned intermediate each resilient support 130, 140 and a set screw 134, 142 such that tightening each set screw 134, 142 results in movement of the associated pusher 144, 145, thereby similarly moving the resilient support 130, 140, so as to facilitate adjustment of the worm 132 with respect to the worm gear 158.

Adjustment of the worm 132 with respect to the worm gear 158 is performed so as to provide conformity between the worm 132 and the worm gear 158, such that engagement of the worm 132 with the worm gear 158 is substantially optimized throughout the complete range of rotation of the worm gear 158 with respect to the worm 132. That is, such adjustment is performed so as to attempt to make engagement of the worm 132 with the worm gear 158 approximately the same regardless of the relative rotational positions of the worm 132 and the worm gear 158. In this manner, the friction or drag associated with engagement of the worm 132 with respect to the worm gear 158 is approximately the same throughout the complete range of adjustment.

As those skilled in the art will appreciate, various conditions, such as an out of round condition of the worm gear 158, machining defects and the worm 132 and/or the worm gear 158, misalignment of the worm gear 158 upon its shaft, etc., will tend to cause undesirable variations in the drag or friction associated with turning of the worm gear 158 by the worm 132. Adjusting the worm 132 closer to the worm gear 158 tends to increase such drag or friction, while adjusting the worm 132 away from the worm gear 158 tends to reduce such drag or friction. Adjusting the position of the worm 132 too close to the worm gear 158 may result in binding of the worm 132 and worm gear 158, particularly if such a manufacturing imperfection is present. Thus, adjustment is performed so as to minimize the drag or friction at any points throughout the range of motion of the worm gear 158 with respect to the worm 132, while also maintaining a desired degree of engagement of the worm 132 with respect to the worm gear 158. The resilient supports 130, 140 facilitate such adjustment. Also, wear of the worm 132 or the worm gear 158 will tend to affect conformity.

The resilient supports 130, 140 also provide for vibration damping of the telescope 12 with respect to the tripod 28. As those skilled in the art will appreciate, inadvertently bumping or tapping the telescope during use thereof frequently results in undesirable oscillation or vibration of the telescope which causes the field of view to move substantially, thereby inhibiting viewing or photography. Also, it is not unusual for a user to accidentally bump an altitude or azimuth adjustment knob during use thereof, so as to cause such undesirable oscillation or vibration of the telescope 12. Thus, if someone accidentally taps the telescope, or bumps it, as when attempting to look through the eyepiece and inadvertently tapping the eyepiece with the user's forehead, then the telescope may begin to oscillate or vibrate undesirably and may continue to do so for a substantial length of time, occasionally in excess of 30 seconds. It has been found that the resilient supports 130, 140 tend to dampen such undesirable oscillation or vibration of the telescope 12 such that it quickly ceases such undesirable oscillation or vibration, typically within a few seconds.

The resilient supports 130, 140 also tend to inhibit the transmission of undesirable vibration from the drive motors, when installed, to the telescope 12, so as to further enhance viewing and photography. The resilient supports 130, 140 also tend to reduce audible noise, such as that due to engagement of the worm 132 with the worm gear 158 during motor operation.

The spacer 57 of the friction lock 20 is removed, so as to accommodate worm drive housing 58. The shaft 62 remains rotatably attached to the fork 74 via nut 60. Tab washers 56 and 162 are disposed upon either side of worm gear 158 with the tabs thereof received by slot 63 of shaft 62 such that tab washers 56 and 162 rotate along with shaft 62. Plastic friction washers 156 and 160 are disposed intermediate each tab washer 56, 162 and worm gear 158. The plastic friction washers 156 and 160 are preferably comprised of polystyrene so as to mitigate changes in friction between the tab washers 56, 162 and the worm gear 158 in the event that tab washers 56, 162 or worm gear 158 becomes contaminated with a lubricant such as oil or grease.

To upgrade from friction drive to manual worm drive, it is merely necessary to remove the knob 50 and nut 52 from the shaft 62 of the friction drive 20 by rotating the knob 50 counter clock wise until the nut 52 completely unthreads from the shaft 62. The washer 54 and the spacer 57, along with bearing washer 56, are then removed from the shaft 62. The worm gear assembly 121 is then positioned over the shaft 62 such that it engages the lip 71 of the fork 74. Tab washer 162, plastic friction washer 160, worm gear 158, plastic friction washer 156, tab washer 56, washer 54, and nut 52 are then placed over shaft 62, in that order, and the nut 52 is then tightened. Threaded fasteners, such as screws, pass through holes 201 (preferable 3 spaced apart holes) in the worm drive housing 58 and threadedly engage threaded holes 200 of the fork 74. Knob 50 is then attached to nut 52. Once assembled, knob 50 is turned so as to cause tab washers 56 and 162, which rotate along with shaft 62, to frictionally engage worm gear 158, which rotates independently of shaft 62, via plastic friction washers 156 and 160. Thus, tightening knob 50 tends to cause rotation of worm gear 158 to cause like rotation of shaft 62.

Once so installed, the manual worm gear effects altitude adjustment by merely turning worm gear knob 120. Thus, turning worm gear knob 120 effects rotation of worm 132, which causes worm gear 158 to rotate. When knob 50 is tightened sufficiently, it causes worm gear 158 to rotate substantially along with shaft 62, such that rotation of worm 132 effects rotation of shaft 62, which causes the telescope to move in altitude. The azimuth worm drive similarly comprises worm 186 and worm gear 198. Worm gear 198 is similarly sandwiched between tab washers 190 and 192 with plastic friction washers 180 and 194 being located intermediate tab washers 190 and 192 and worm gear 198.

Referring now to FIGS. 11–16, the upgradeable telescope system of the present invention may easily be upgraded from manual worm drive to motorized worm drive. Although manual worm drive does provide easier and more precise positioning of the telescope than friction locks, such manual worm drives do require continuous manual adjustment in order to keep a desired celestial object within the field of view. Indeed, when such celestial objects are being photographed, particularly at high magnifications, it is necessary to very accurately provide such continuous adjustment of the telescope so as to maintain the desired celestial object within the same position in the field of view of the telescope. As those skilled in the art will appreciate, such precise control of the telescope is necessary so as to obtain a quality photograph having desired brightness and quality, e.g., lacking blurring due to misalignment of the telescope during imaging.

Motorized worm gears may be operated either manually or automatically, e.g., under computer control. During manual operation, a hand held controller 11 (FIG. 1), preferably having either a key pad 15 or a joy stick 13, is utilized so effect such manual control of the motorized worm drives. By utilizing computer control of the motorized worm drives, then the computer may be programmed to maintain alignment of the telescope 12 with the desired celestial object, so as to facilitate viewing and/or photography thereof.

Upgrading manual altitude worm drive 121, for example, so as to provide motorized control thereof, merely involves removing the manual worm drive knob 120 (FIGS. 5 and 6) therefrom by housing set screw 121 and then attaching the drive motor assembly 240. The drive motor assembly 240 is attached to the worm gear housing 58 by receiving the tapered distal end 133 of the worm gear 132 within the output gear 252 of motor drive assembly 240, such that the tapered distal end 133 of the worm gear 132 engages the output gear 252 (best shown in FIGS. 13 and 14). A set screw may be used to attach the output gear 252 to the worm 132, if desired. Flat 131 of the worm 132 engages complimentary flat of the output gear 252 to provide positive attachment. The motor drive assembly 240 is then secured to the worm drive housing 58 by threading attachment shaft 243 (best shown in FIGS. 13 and 14) into threaded aperture 117 (best shown in FIG. 5) formed in flange 213. Thus, rotation of the motor 250 effects rotation of worm drive 132 via output gear 252 of the worm drive assembly 240. The azimuth motor drive assembly 244 is attached in a like manner.

Figure 15:
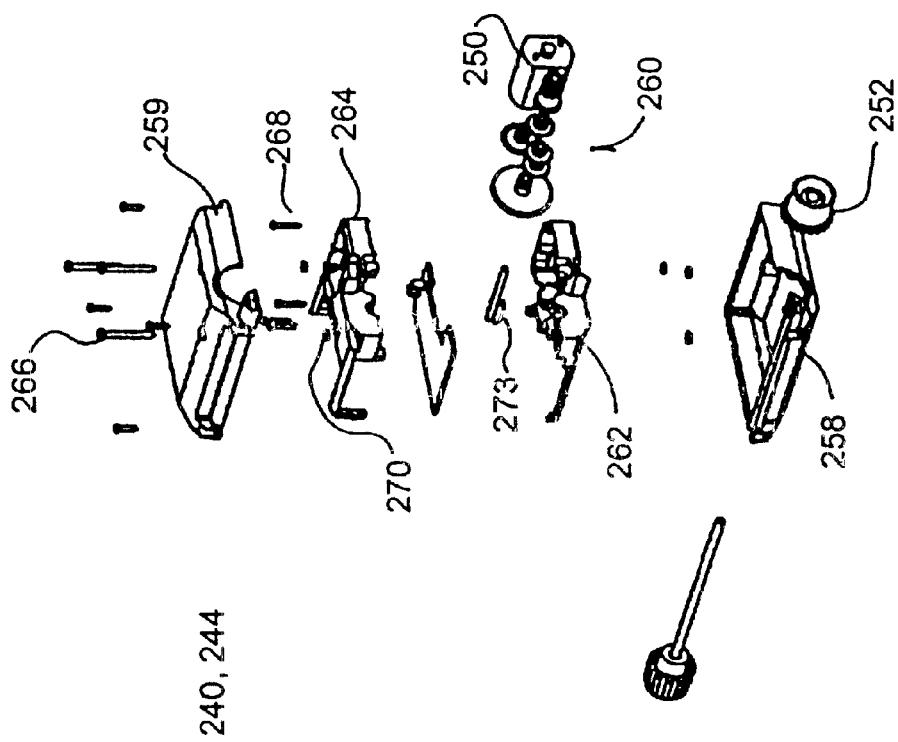
FIG. 15 is an exploded perspective view of the motor drive assembly of FIG. 13.
Figure 16:
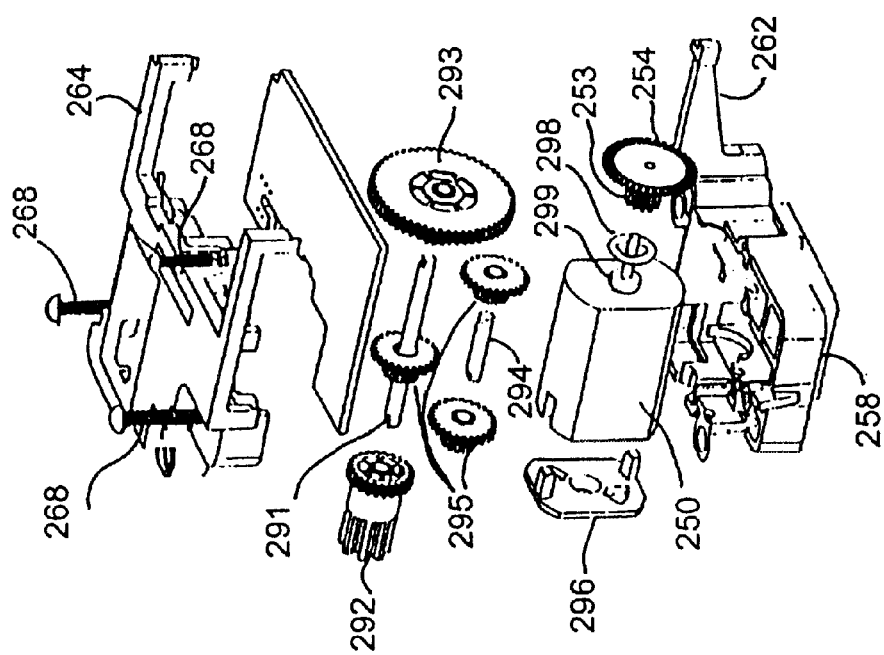
FIG. 16 is an exploded perspective view of the platform, motor, and reduction gear assembly of FIG. 13.

With particular reference to FIGS. 13–16, the motor drive assemblies 240, 244 comprise a motor 250 and a reduction gear assembly 260 disposed upon a platform defined by upper platform section 264 and lower platform section 262 (best shown in FIGS. 15 and 16). The motor 250 is mounted to the platform 251 in a manner which provides shock/vibration isolation of the motor 250 with respect to the platform 251. More particularly, a resilient o-ring 298 (FIG. 16) is positioned about front motor boss 299 such that the lower 262 and upper 264 platform sections clamp about and capture the front boss 299 with the o-ring 298 between the front boss 299 and the upper 264 and lower 262 platform sections. Resilient mount 296 isolates the rear end of the motor 250 from the platform. Alternatively, an o-ring can be used to isolate the rear end of the motor in a manner similar to that of the front end. Resilient mount 296 attaches to the rear of motor 250 and to the platform 251 so as to hold the motor 250 in position with respect to the platform 251, while minimizing the transmission of vibration from the motor 250 to the platform 251. The platform 251 is likewise shock/vibration isolated from the upper 259 and lower 258 housing sections of the motor drive assemblies 240, 244, so as to provide further isolation of the motor 250 with respect to the telescope 12. As shown in FIG. 15, a pair of resilient o-rings 270, 272 are located upon each of three screws 266 which attach the platform 251 (defined by upper 264 and lower 262 platform sections) to the motor drive housing defined by upper 259 and lower 258 housing sections. Thus, the platform 251 is sandwiched between resilient o-rings 270, 272 with each motor drive assembly 240, 244. Yet further isolation of the telescope 12 with respect to the motor 250 is provided by the resilient worm gear supports 130 and 140, as discussed above.

Vibration isolation of the motor 250 with the o-ring 298 and the resilient mount 296, as well as vibration isolation of the platform 251 with the resilient o-rings 270, 272, substantially reduces audible noise associated with operation of the motor 250. As those skilled in the art will appreciate, telescope drive motors, particularly those of larger telescopes, may produce substantial and undesirable noise during operation thereof.

Such motor noise can be extremely annoying. It has been found that such vibration isolation of the motor 250 and the platform 251 substantially reduces such audible noise, thereby enhancing the overall utility and desirability of the telescope system. Thus, such isolation of the motor 250 and the platform 251 mitigates both undesirable vibration of the telescope 12 and undesirable audible noise.

According to the preferred embodiment of the present invention, the reduction gear assembly 260 comprises primary gear 253, which is attached directly to the output shaft of motor 250, intermediate gears 292, 293, and 295, which are driven by the primary gear 253, and output gear 252, which facilitates interconnection to the worm 132. Intermediate gears 291, 292, 293 and 295 rotate upon shafts 291 and 294. According to the preferred embodiment of the present invention, the reduction gear assembly 260 is configured so as to provide a motor 250 to output gear 252 ratio of approximately 205.3 to 1. Further, the worm 132 to worm gear 158 ratio is preferably approximately 60 to 1. The motor preferably operates from approximately 0 to approximately 15,000 rpm.

Encoder wheel 254 is preferably formed upon primary gear 253, such that encoder wheel 254 rotates with primary gear 253. Encoder 254 cooperates with a pair of photo diodes 256 and an LED 255 so as to operate in quadrature, thereby providing precise position control of the telescope 12. The encoder wheel preferably has 36 teeth.

Figure 12:
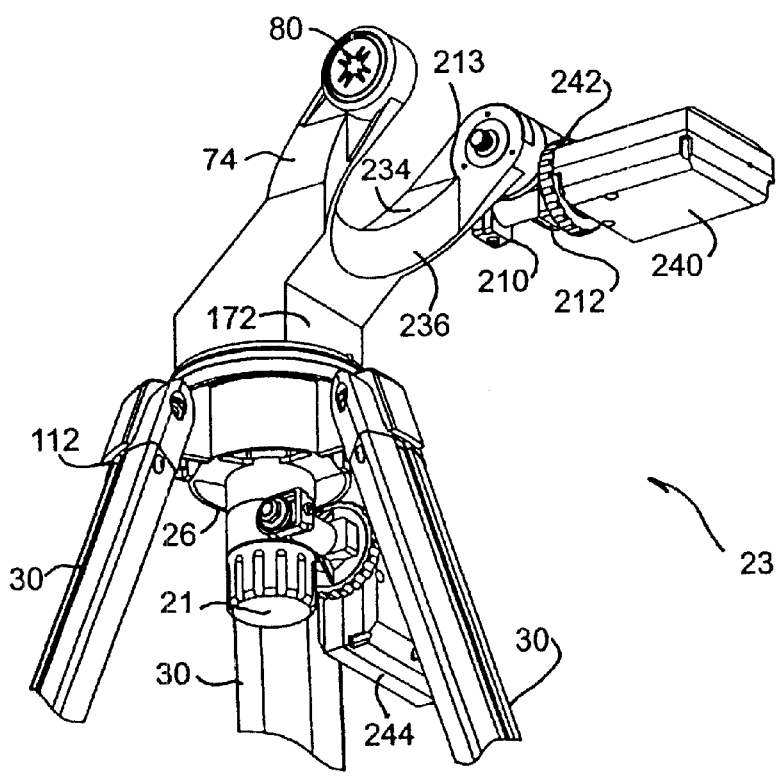
FIG. 12 is a second perspective view of the telescope mount of FIG. 5, wherein both the altitude and azimuth manual worm drives thereof have been upgraded to motorized worm drives.
Figure 13:
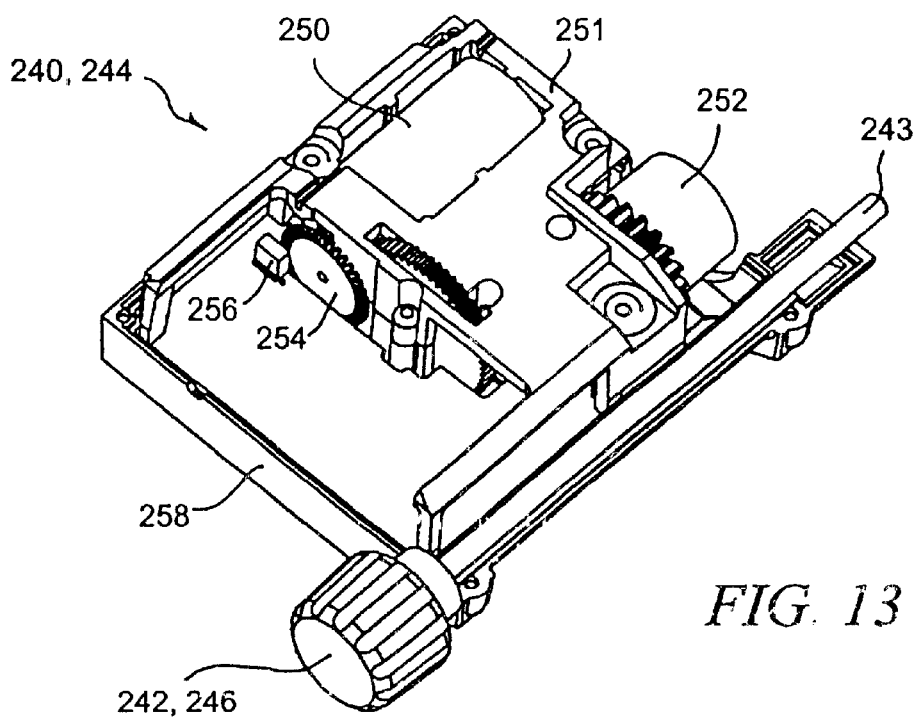
FIG. 13 is a perspective view of a motor drive assembly having the upper housing section thereof removed.
Figure 14:
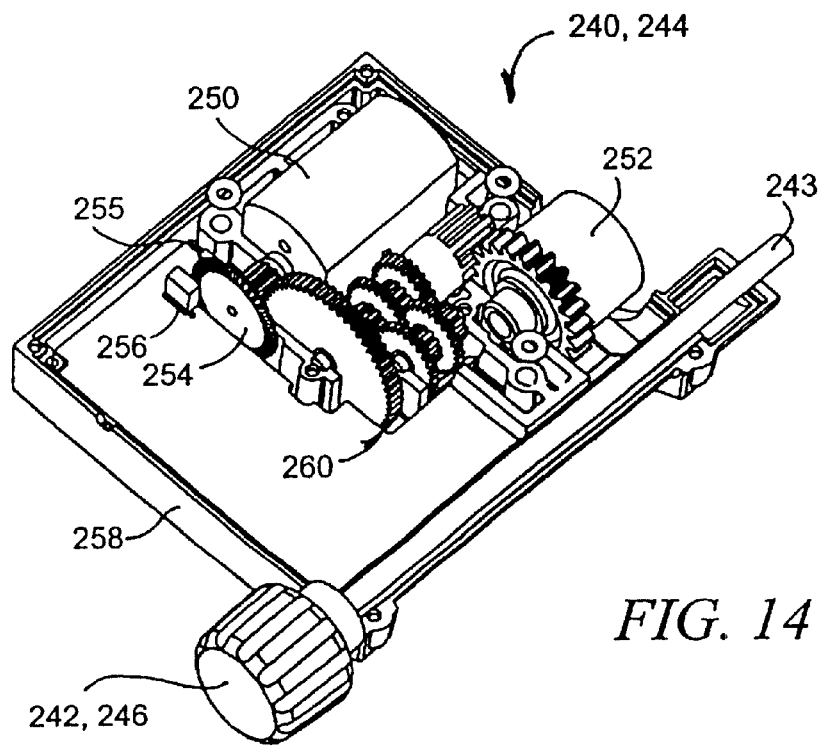
FIG. 14 is a perspective view of the drive motor assembly of FIG. 13 having the upper platform section removed therefrom.

Referring now to FIGS. 11 and 12, the mount 23 is preferably configured so as to accommodate enhanced below the horizon and zenith viewing therewith. The mount 23 comprises cutouts 234 and 236 formed therein so as to mitigate interference of the telescope 12 with the mount 23 as the telescope is moved to the two extremes of the altitude travel. Cutout 234 thus allows the telescope 12 be to oriented at a greater angle below the horizontal than would be possible without the cutout 234. Similarly, cutout 236 allows the telescope 12 to be oriented at a greater angle with respect to horizontal during zenith viewing. According to the preferred embodiment of the present invention, the cutouts 234 and 236 are formed in the fork 74 (which comprises arms 230, 232). However, those skilled in the art will appreciate that the cutouts 234 and 236 may alternatively be formed in the arms 230, 232, the base 172, and/or any other portion of the mount 23 which would otherwise interfere with and undesirably limit movement of the telescope 12 with respect to the mount 23.

Referring now to FIG. 4, the tripod 28 is preferably configured such that the legs 30 thereof remain in either the deployed or stowed positions while the tripod is being handled, e.g., picked up and carried. More particularly, a detent 108 is formed upon the tripod head 26 such that a corresponding flat surface 27 at the upper end of each tripod leg 30 must engage and substantially compress the detent 108 in order to move between the stowed and deployed positions. In this manner, each leg 30 tends to stay in either the stowed or deployed position until sufficient force is applied to the leg 30 so as to partially compress the detent 108 and thereby urge the leg into the opposite position thereof. Those skilled in the art will appreciate that the detent 108 may alternatively be formed upon the upper end of each leg 30 and the corresponding generally flat surface formed upon the tripod head 26. The tripod head 26 is preferably formed of a durable polymer material.

Outboard stop 112 defines the extended position of each leg by limiting the travel outboard thereof. Similarly, inboard stop 110 defines the stowed position of each leg by limiting the inboard travel thereof.

Figure 10:
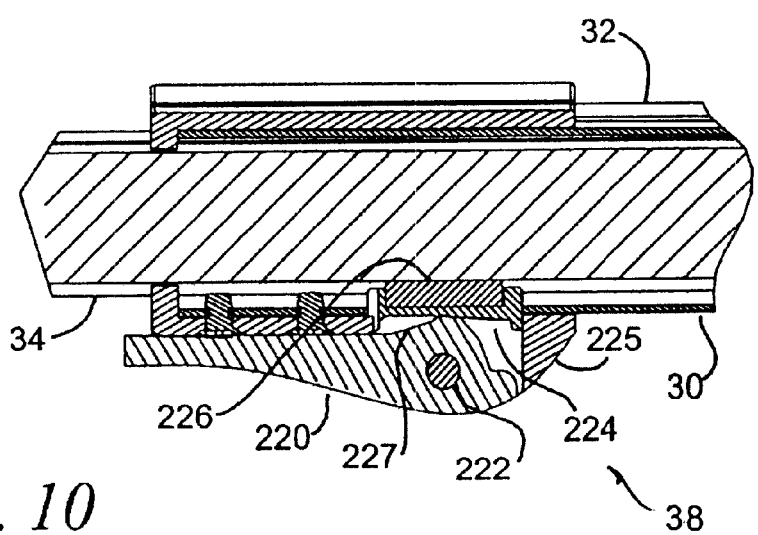
FIG. 10 is an enlarged cross sectional side view of a tripod leg lock of FIG. 1.

Referring now to FIG. 10, each tripod leg 30 preferably comprises a cam lock 38 for positively and reliably locking each lower leg section 34 into a desired position with respect to each upper leg section 32. Each cam lock 38 comprises a lever 220 pivotally attached to the upper leg section 32 via pivot pin 222 which extends through the lever 220, as well as through the housing 225 of the cam lock 38. A cam 227 is formed upon the lever 220 such that the cam 227 contacts a pusher 224 and urges the pusher 224 toward the lower leg section 34 when the lever 220 is moved, preferably toward the upper leg section 32. A resilient pad 226 is positioned upon the in board surface of the pusher 224 such that when the pusher 224 is urged toward the lower leg section 34, the friction pad 226 contacts the lower leg section 34 and holds the lower leg section 34 in position relative to the upper leg section 32. The cam 227 formed upon the lever 220 is configured as an over-centered device, such that after the lever 220 is moved to either the actuated or unactuated position thereof, the lever 220 it tends to stay in that position until sufficient force is applied so as to move the lever 220 to the other position thereof.

Thus, the lever 220 is pulled away from the leg 30 to unlock the leg 30 and allow the lower leg section 34 slide into and out of the upper leg section 32. After adjusting the leg 30 to the desired length, the level 220 is pushed toward the leg 30 to lock the lower leg section 34 in position with respect to the upper leg section 32.

Figure 17:
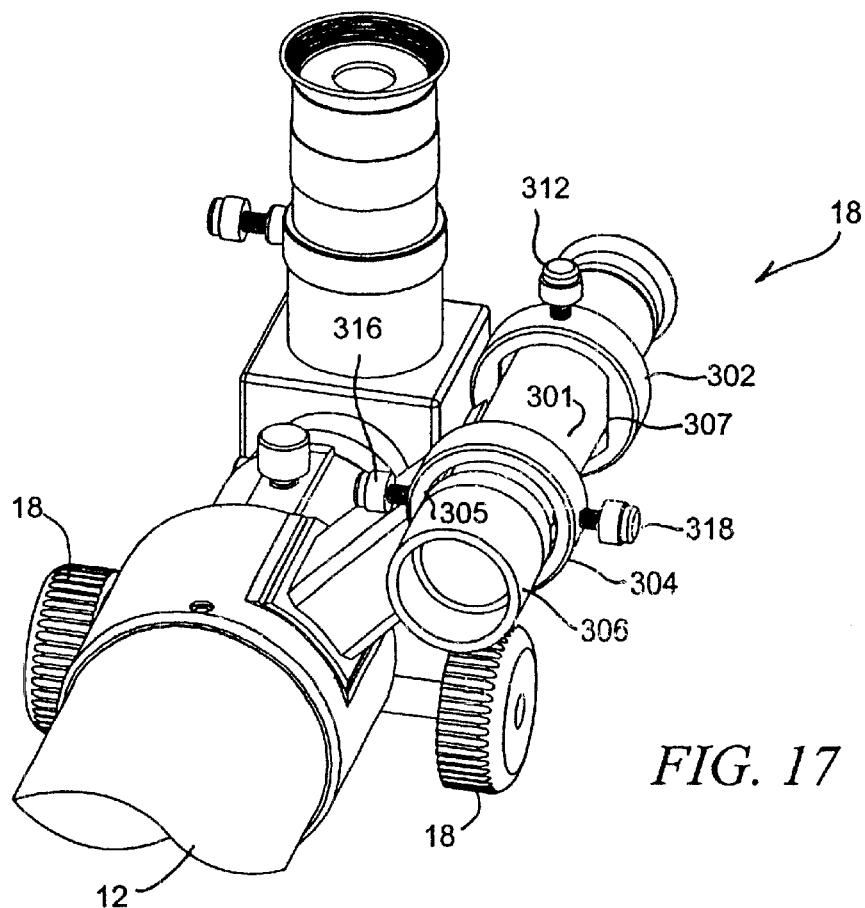
FIG. 17 is a perspective view of a finder scope having two sets of parallel knife edges which facilitate X-Y adjustment of the finder scope according to the present invention.
Figure 18:
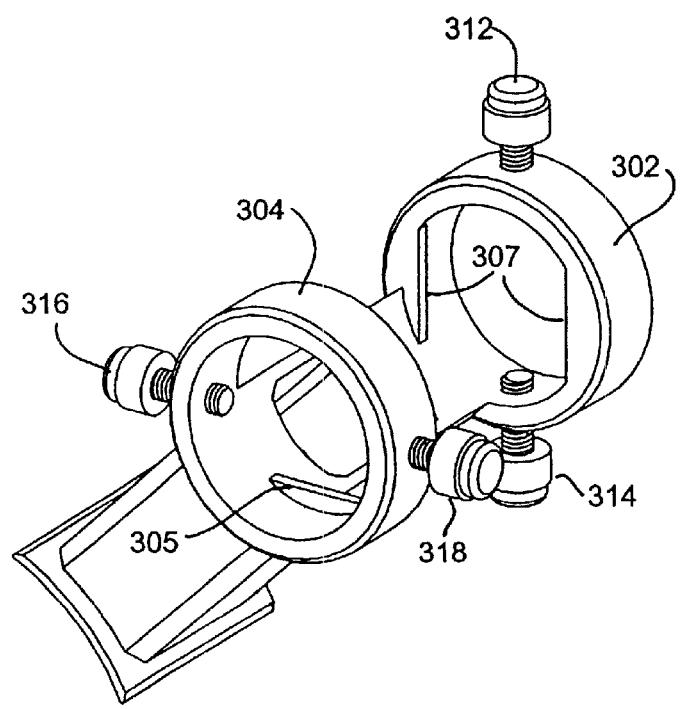
FIG. 18 is an enlarged perspective view of the brackets of the finder scope of FIG. 17, better showing the two sets of parallel knife edges thereof.
Figure 19:
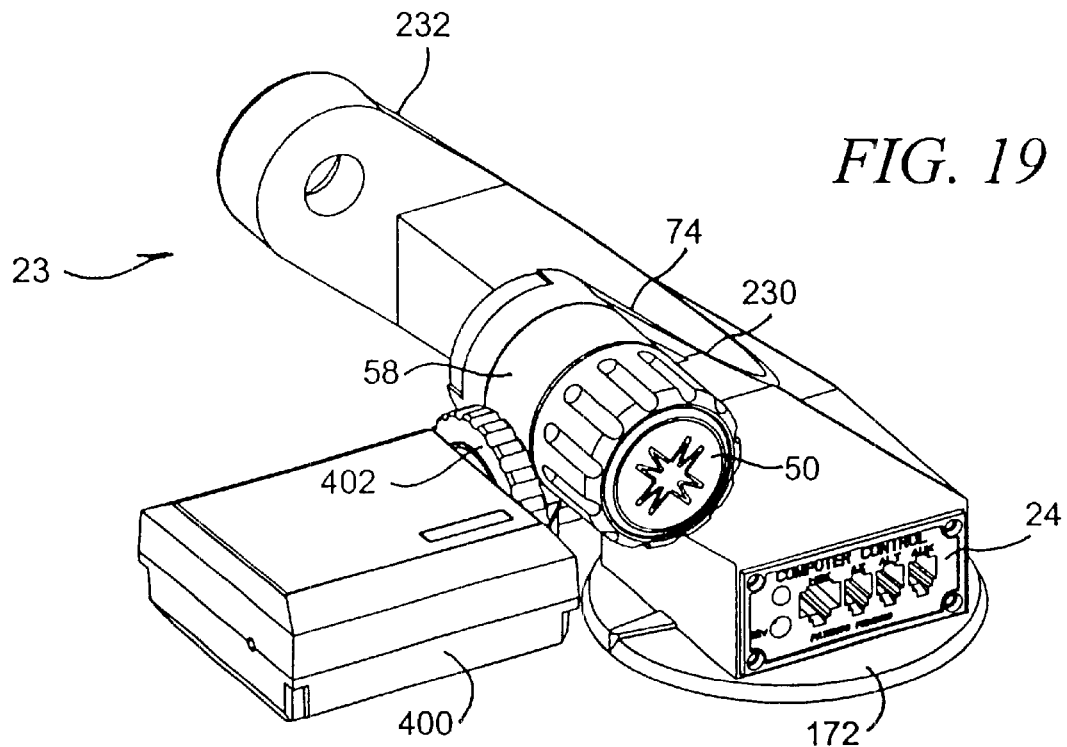
FIG. 19 is a perspective view of an alternate motor drive assembly attached to a telescope mount.
Figure 20:
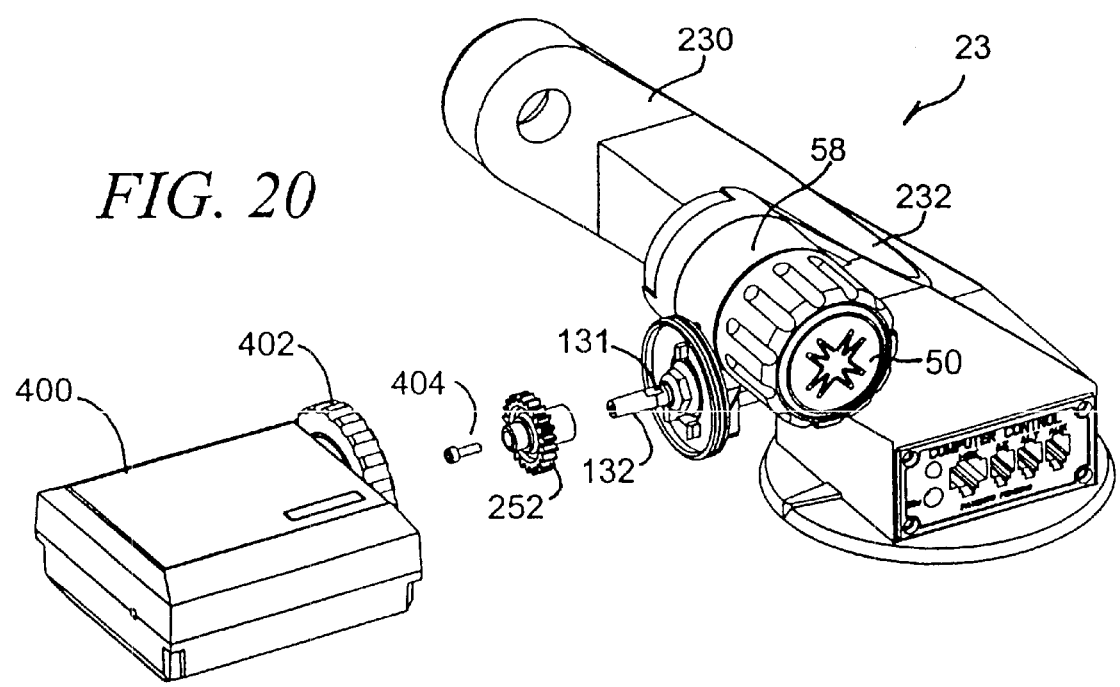
FIG. 20 is a perspective view showing the alternate motor drive assembly exploded away from the telescope mount of FIG. 19.

Referring now to FIGS. 17 and 18, the upgradeable telescope system of the present invention comprises an X-Y finder scope 18 wherein two sets of diagonally opposed set screws facilitate alignment of the finder scope 18 with the telescope 12 in one X-Y direction at a time, so as to substantially simplify the alignment procedure.

The finder scope 18 comprises a tube 301 attached to the telescope 12 via brackets 304 and 302. Each bracket 302, 304 comprises a pair of generally parallel knife edges 305 and 307, respectively. Knife edges 305 are oriented such that they are generally orthogonal with respect to knife edges 307. The tube 301 extends through openings defined by knife edges 305 and 307 such that the forward end of the finder scope 18 can slide along one direction within the opening defined by knife edges 305 and the rear end of finder scope 18 can slide along another direction, which is perpendicular to the first direction, within the opening defined by knife edges 307.

A first pair of diametrically opposed set screws 316 and 318 are threadedly attached to the front bracket 304 so as to move the forward end of the finder scope 18 in the first direction and a similar pair of diametrically opposed set screws 312, 314, positioned orthogonal to the first pair of set screws 316, 318, are threadedly attached to the rear bracket 302 so as to similarly effect movement of the rear end of the finder scope 18. Thus, the finder scope 18 can be aligned in two generally orthogonal directions, one direction at a time. To perform alignment of the finder scope 18, it is merely necessary to loosen one set screw of a selected pair of set screws, and then to tighten the opposed set screw of the selected pair. This process is generally performed upon each pair of set screws. Once the finder scope 18 is aligned, then all of the set screws 312, 314, 316, 318 are tightened so as to maintain desired alignment of the finder scope 18 with respect to the telescope 12.

Alternatively, the finder scope 18 may be aligned by simply loosening all four set screws 312, 314, 316, 318 and then manually positioning the finder scope 18, as desired. Thus, after the set screws 312, 314, 316, 318 are loosened, the finder scope 18 is slid within the openings defined by the parallel knife edges 305 and 307 so as to effect desired alignment of the finder scope 18 with respect to the telescope 12. After aligning the finder scope 18 with respect to the telescope 12, then the set screws 312, 314, 316, 318 are tightened carefully, preferably in opposed pairs, so as to mitigate movement of the finder scope 18 with respect to the telescope 12, and thus maintain desired alignment thereof.

Referring now to FIGS. 19 through 23, an alternative configuration of the motor drive assembly 400 and the worm drive housing 58 to which the motor drive assembly 400 attaches is shown. According to this alternative configuration, the motor drive assembly 400 attaches to the worm drive housing 58 via a threaded collar 402 which threadedly attaches to a complimentary threaded boss 406 formed upon the worm drive housing 58.

Figure 21:
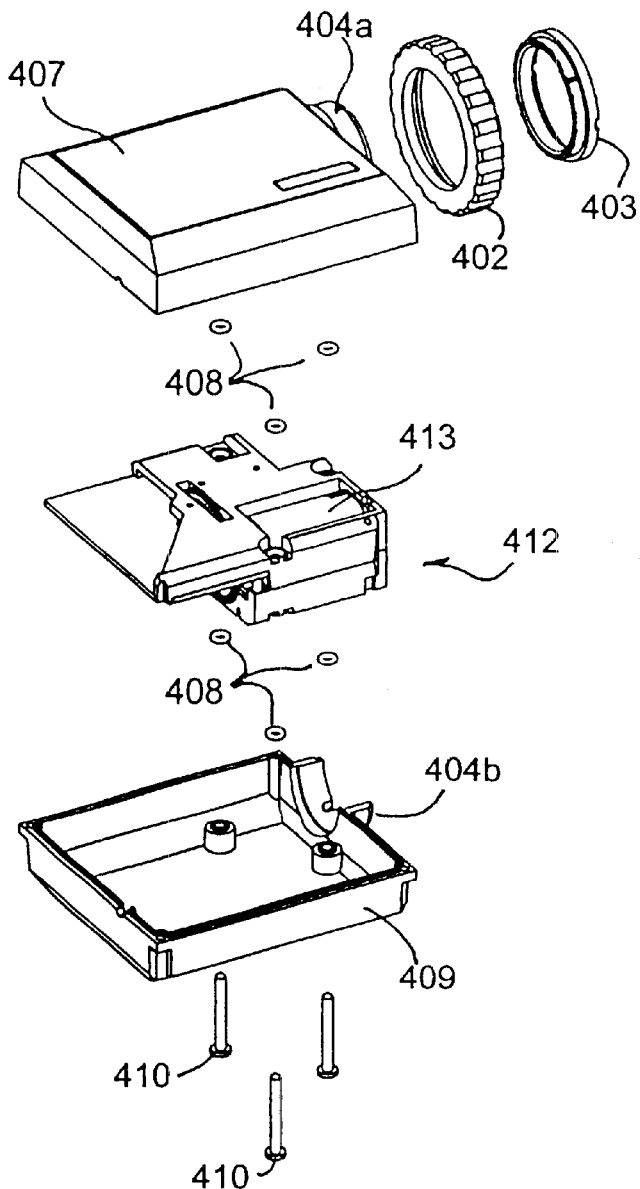
FIG. 21 is an exploded perspective view of the motor drive assembly of FIG. 19 showing the motor platform therein.

With particular reference to FIG. 21, the threaded collar 402 attaches to the motor drive assembly 400 (defined by upper 407 and lower 409 motor drive housings) via threaded collar retainer 403 which threadedly attaches to upper 404A and lower 404B threaded couplings formed upon the upper 407 and lower 409 motor drive housings, respectively.

The output gear 252 of the reduction gear assembly 253 (FIG. 23) is disposed within the threaded collar 402 and the worm 131 is disposed within the threaded boss 406, such that the motor 413 (FIGS. 21–23) drives the worm 131 through its attachment i.e., the threaded collar 20 and the threaded boss 406, to the telescope mount 23.

Thus, according to this alternative configuration of the motor drive assembly 400 and the worm drive housing 58, the motor drive assembly 400 is attached to the worm drive housing 58 simply by removing the knob (not shown) from the worm 133 and attaching the output gear 252 to the worm 133 in place of the knob. Set screw 404 may optionally be used to effect such attachment. The motor drive assembly 400 is then attached to the worm drive housing 58 by threading the threaded collar 402 to the threaded boss 406, while simultaneously allowing output gear 252 to engage reduction gear assembly 253. Key 405 formed upon threaded collar 402 is received within a complimentary recess (not shown) formed in threaded boss 406 and assures desired alignment of the motor drive assembly 400 with respect to the worm drive housing 58. It has been found that this alternative method of attachment provides enhanced rigidity.

Figure 22:
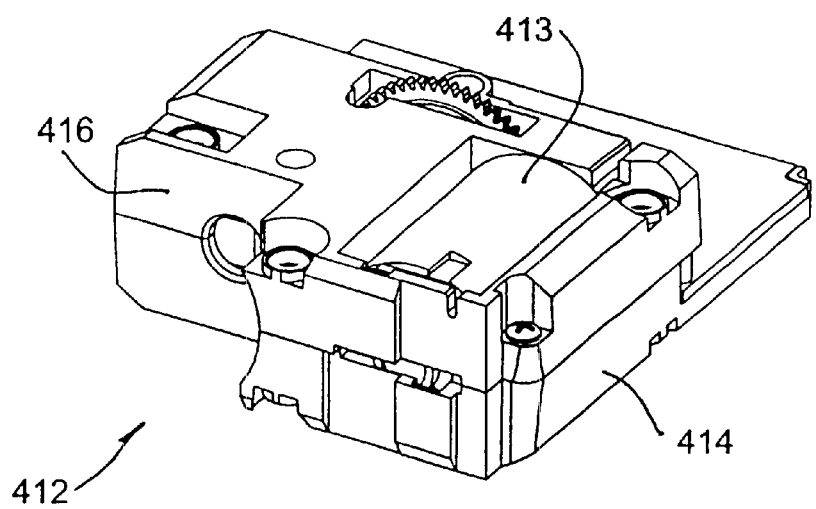
FIG. 22 is an enlarged perspective view of the motor platform of FIG. 21.
Figure 23:
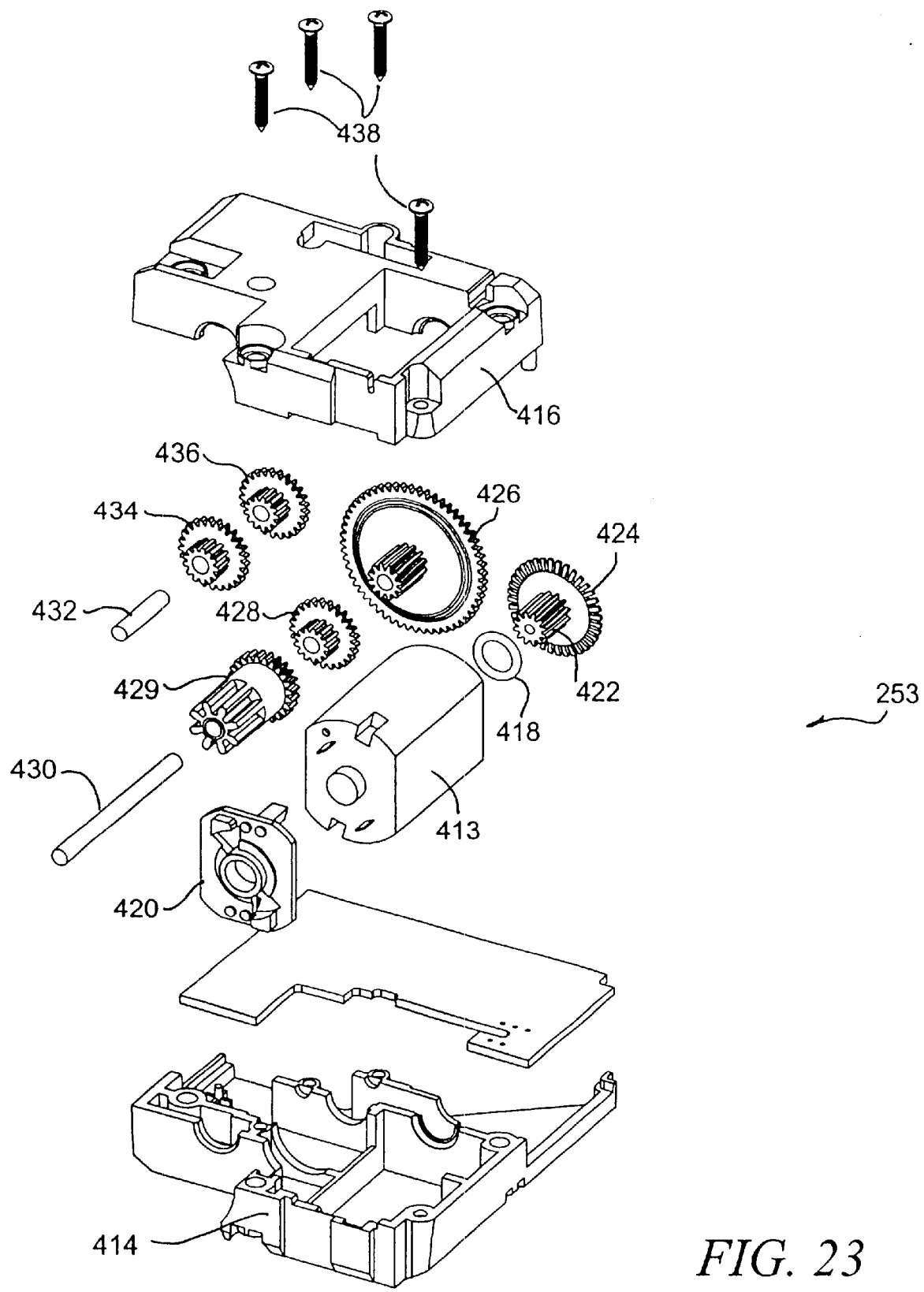
FIG. 23 is an exploded perspective view of the motor platform of FIG. 22.

Referring now to FIGS. 21 through 23, the motor 413 is mounted upon a platform 412 via shock/vibration isolators as discussed above and the platform 412 is mounted to the upper 407 and lower 409 motor drive assembly housings via shock/vibration isolation resilient O-rings 408 which are disposed upon either side thereof and are disposed about threaded fasteners 410 as described in detail above. The platform 412 comprises upper 416 and lower 414 platform sections.

With particular reference to FIG. 23, the motor 413 and the reduction gear assembly 253 defined by gears 426, 428 and 429 disposed upon shaft 430 and gears 434 and 436 disposed upon shaft 432 are disposed upon the platform 412. An encoder 424 is formed integrally with motor output gear 422, as discussed above. The motor 413 and the reduction gear assembly 253 are captured intermediate the upper 416 and lower 414 platform sections. The motor 413 is resiliently mounted to the upper 416 and lower 414 platform sections via resilient motor mount 420 and o-ring 418 which are captured by the upper 416 and lower 414 platform sections, as described in detail above.

It is understood that the exemplary upgradeable telescope system described herein and shown in the drawings represents only a presently preferred embodiment of the invention. Indeed, various modifications and additions may be made to such embodiment without departing from the spirit and scope of the invention. For example, those skilled in the art will appreciate that various different mechanical configurations of the worm drive assembly and the motor drive assembly are likewise suitable for facilitating easy and convenient upgrading. Also, various different configurations of the friction lock are contemplated. Thus, these and other modifications and additions may be obvious to those skilled in the art and may be implemented to adapt the present invention for use in a variety of different applications.

We claim:

1. A telescope system of the type commonly used to observe/photograph celestial objects, the telescope system comprising:

a telescope;

a tripod supporting the telescope;

a first shaft rigidly attached to the telescope;

a mount attaching the telescope to the tripod in a manner which facilitates rotation of the telescope about two generally orthogonal axes with respect to the tripod, the mount comprising:

a base;

two arms extending from the base, the first shaft being pivotally attached to one of the two arms to define a first axis of the two generally orthogonal axes;

a second shaft rigidly attached to the base and pivotally attached to the tripod to define a second axis of the two generally orthogonal axes;

at least one worm drive for effecting desired movement of the telescope with respect to the tripod, each worm drive comprising:

a worm gear formed upon one of the first and second shafts;

a worm having first and second ends, the worm being configured to engage the worm gear;

a pair of resilient supports for each worm, one resilient support being located proximate the first end of the worm and the other resilient support being located proximate the second end of the worm, the resilient supports providing shock/vibration isolation of the worm with respect to the telescope, wherein each of the resilient supports comprises a body having a flat side and an opening formed through the body, the worm extending through the opening; and a bushing located within the opening of the body of the support for facilitating rotation of the worm with respect to the support.

2. A telescope system of the type commonly used to observe/photograph celestial objects, the telescope system comprising:

a telescope;

a tripod supporting the telescope;

a first shaft rigidly attached to the telescope;

a mount attaching the telescope to the tripod in a manner which facilitates rotation of the telescope about two generally orthogonal axes with respect to the tripod, the mount comprising:

a base;

two arms extending from the base, the first shaft being pivotally attached to one of the two arms to define a first axis of the two generally orthogonal axes;

a second shaft rigidly attached to the base and pivotally attached to the tripod to define a second axis of the two generally orthogonal axes;

at least one worm drive for effecting desired movement of the telescope with respect to the tripod, each worm drive comprising:

a worm gear formed upon one of the first and second shafts;

a worm having first and second ends, the worm being configured to engage the worm gear;

a pair of resilient supports for each worm, one resilient support being located proximate the first end of the worm and the other resilient support being located proximate the second end of the worm, the resilient supports providing shock/vibration isolation of the worm with respect to the telescope, wherein each of the resilient supports comprises a body having a flat side and an opening formed through the body, the worm extending through the opening; and two set screws, one set screw for adjusting a position of each one of the two resilient supports so as to adjust a position of the worm with respect to the worm gear.

3. The telescope system according to claim 2, further comprising a pusher block for each support, one of the set screws pushing against the pusher block and the pusher block pushing against the flat side of the support.

4. A worm drive for effecting desired movement of a telescope, the worm drive comprising:

a worm gear;

a worm having first and second ends, the worm being configured to engage the worm gear;

a pair of resilient supports for each worm, one resilient support being located proximate the first end of the worm and the other resilient support being located proximate the second end of the worm, the resilient supports providing shock/vibration isolation of the worm with respect to the telescope, wherein each of the resilient supports comprises a body having a flat side and an opening formed through the body, the worm extending through the opening; and a bushing located within the opening of the body of the support for facilitating rotation of the worm with respect to the support.

5. A worm drive for effecting desired movement of a telescope, the worm drive comprising:

a worm gear;

a worm having first and second ends, the worm being configured to engage the worm gear;

a pair of resilient supports for each worm, one resilient support being located proximate the first end of the worm and the other resilient support being located proximate the second end of the worm, the resilient supports providing shock/vibration isolation of the worm with respect to the telescope, wherein each of the resilient supports comprises a body having a flat side and an opening formed through the body, the worm extending through the opening; and two set screws, one set screw for adjusting a position of each one of the two resilient supports so as to adjust a position of the worm with respect to the worm gear.

6. The worm drive according to claim 5, further comprising a pusher block for each support, one of the set screws pushing against the pusher block and the pusher block pushing against the flat side of the resilient support.

7. A telescope system of the type commonly used to observe/photograph celestial objects, the telescope system comprising:

a telescope;

a tripod supporting the telescope;

a first shaft rigidly attached to the telescope;

a mount attaching the telescope to the tripod in a manner which facilitates rotation of the telescope about two generally orthogonal axes with respect to the tripod, the mount comprising:

a base;

two arms extending from the base, the first shaft being pivotally attached to one of the two arms to define a first axis of the two generally orthogonal axes;

a second shaft rigidly attached to the base and pivotally attached to the tripod to define a second axis of the two generally orthogonal axes;

at least one worm drive for effecting desired movement of the telescope with respect to the tripod, each worm drive comprising:

a worm gear located upon at least one of the first and second shafts;

a worm having first and second ends, engaging each worm gear;

a pair of supports for each worm, one support being located proximate the first end of the worm and the other support being located proximate the second end of the worm; and two set screws, one set screw for adjusting a position of each one of the two supports, so as to adjust a position of the worm with respect to the worm gear.

8. The telescope system according to claim 7, wherein each support comprises a resilient support for providing shock/vibration isolation of the telescope with respect to the worm.

9. The telescope system according to claim 8, further comprising a pusher block for each support, one of the set screws pushing against the pusher block and the pusher block pushing against the support.

10. The telescope system according to claim 7, wherein each support comprises a rubber support.

11. A The telescope system according to claim 7, wherein each of the supports comprise a body having a flat side and an opening formed through the body, one of the first and second ends of the worm extending through the opening.

12. The telescope system according to claim 11, further comprising a bushing located within the opening of body for facilitating rotation of one of the first and second shafts with respect to the body.

13. A worm drive for effecting desired movement of telescope with respect to a tripod, the worm drive comprising:

a worm gear;

a worm having first and second ends, engaging the worm gear;

a pair of supports, one support being located proximate the first end of the worm and the other support being located proximate the second end of the worm, the supports providing shock/vibration isolation of the worm with respect to the telescope; and two set screws, one set screw for adjusting a position of each one of the two supports, so as to adjust a position of the worm with respect to the worm gear.

14. The worm drive according to claim 13, wherein each support comprises a resilient support for providing shock/vibration isolation of the telescope with respect to the worm.

15. The worm drive according to claim 14, further comprising a pusher block for each support, one of the set screws pushing against the pusher block and the pusher block pushing against the support.

16. The worm drive according to claim 13, wherein each support comprises a rubber support.

17. The worm drive according to claim 13, wherein each of the resilient supports comprise a body having a flat side and an opening formed through the body, one of the first and second ends of the worm extending through the opening.

18. The worm drive according to claim 17, further comprising a bushing located within the opening of body for facilitating rotation of the worm with respect to the body.

* * * * *